United States Patent
Kurata et al.

(10) Patent No.: US 8,044,964 B2
(45) Date of Patent: Oct. 25, 2011

(54) DATA PROCESSOR

(75) Inventors: Shuji Kurata, Tokyo (JP); Seiichi Saito, Tokyo (JP); Yoshiyuki Matsumoto, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 1027 days.

(21) Appl. No.: 11/777,281

(22) Filed: Jul. 12, 2007

(65) Prior Publication Data

US 2008/0049029 A1     Feb. 28, 2008

(30) Foreign Application Priority Data

Jul. 14, 2006   (JP) ................. 2006-194146

(51) Int. Cl.
| | |
|---|---|
| G06F 13/14 | (2006.01) |
| G06F 13/18 | (2006.01) |
| G09G 5/39 | (2006.01) |
| G06K 9/40 | (2006.01) |
| G06K 9/46 | (2006.01) |

(52) U.S. Cl. ........ 345/519; 345/531; 345/535; 382/190; 382/266

(58) Field of Classification Search ........................ None
See application file for complete search history.

(56) References Cited

U.S. PATENT DOCUMENTS

| | | | | |
|---|---|---|---|---|
| 2004/0041813 | A1* | 3/2004 | Kim ............................. | 345/519 |
| 2005/0226508 | A1* | 10/2005 | Gotohda ...................... | 382/190 |
| 2006/0117123 | A1 | 6/2006 | Izumida | |
| 2006/0204053 | A1* | 9/2006 | Mori et al. .................. | 382/118 |
| 2007/0047815 | A1* | 3/2007 | Saito ........................... | 382/181 |
| 2009/0157934 | A1* | 6/2009 | Kato et al. .................. | 710/241 |

FOREIGN PATENT DOCUMENTS

| | | |
|---|---|---|
| CN | 1487475 A | 4/2004 |
| JP | 2000-079860 A | 3/2000 |
| JP | 2003-256358 | 9/2003 |
| JP | 2006-004217 A | 1/2006 |
| JP | 2006-155183 | 6/2006 |

* cited by examiner

*Primary Examiner* — Xiao Wu
*Assistant Examiner* — Tize Ma
(74) *Attorney, Agent, or Firm* — Miles & Stockbridge P.C.

(57) ABSTRACT

A data processor that includes a central processing unit, a graphic controller, a display controller, an image recognizing module, a memory controller and image data input units is disclosed. The components can be formed on a single semiconductor substrate. The display controller can perform display control on image data. The image data input unit stores the image data into a first area in the external memory. The image recognizing module or central processing unit executes an image process on the image data in the first area or image data in a second area, and stores a result of the process in a third area of the external memory.

14 Claims, 9 Drawing Sheets

FIG. 8

| | | THROUGHPUT [Mbytes/s] | | |
|---|---|---|---|---|
| | | TypA | TypB | TypC |
| REAL-TIME MODULES | DISPCNT | 200 | 200 | 200 |
| | VDIOIN1, VDIOIN2 | 100 | 100 | 100 |
| | IMG | 100 | 160 | 180 |
| NON-REAL-TIME MODULES | CPU | 25 | 10 | 5 |
| | GRFC | 25 | 10 | 5 |
| | DMAC | 25 | 10 | 5 |
| | FCONV1 | 25 | 10 | 5 |

| PROCESS | CORRESPONDING IMAGE FORMAT |
|---|---|
| DISTORTION CORRECTION OR BIRD'S EYE VIEW PROCESS | ONLY Y OR RGB |
| IMAGE RECOGNIZING PROCESS | ONLY Y OR YUV |
| GRAPHIC PROCESS | RGB |
| DISPLAY PROCESS ON LCD | RGB |

FIG. 12

| INPUT OF YUV IMAGE DATA | | | |
|---|---|---|---|
| FORMAT CONVERTING PROCESS | PROCESS PATTERN | | |
| | FIRST COMBINATION | SECOND COMBINATION | THIRD COMBINATION |
| FIRST CONVERSION (S2) | YUV → ONLY Y | YUV → RGB | YUV → RGB |
| SECOND CONVERSION (S4) | – | RGB → YUV | – |
| THIRD CONVERSION (S7) | ADD UV DATA TO ONLY Y → RGB | YUV → RGB | – |

FIG. 13

| INPUT OF RGB IMAGE DATA | | | |
|---|---|---|---|
| FORMAT CONVERTING PROCESS | PROCESS PATTERN | | |
| | FOURTH COMBINATION | FIFTH COMBINATION | SIXTH COMBINATION |
| FIRST CONVERSION (S2) | RGB → YUV → Y | – | – |
| SECOND CONVERSION (S4) | – | RGB → YUV | RGB → YUV |
| THIRD CONVERSION (S7) | ADD UV DATA TO ONLY Y → RGB | YUV → RGB | – |

DATA PROCESSOR

CROSS-REFERENCE TO RELATED APPLICATIONS

The disclosure of Japanese Patent Application No. 2006-194146 filed on Jul. 14, 2006 including the specification, drawings and abstract is incorporated herein by reference in its entirety.

BACKGROUND OF THE INVENTION

The present invention relates to a data processor performing image recognition and display control on input image data and a technique effectively applied to, for example, an in-vehicle navigation system.

As data processing systems for receiving image data in a real-time manner and performing image recognition such as feature extraction on input image data, image display control using the recognition result, and the like, there are an in-vehicle navigation system, a surveillance camera system, and the like. As a data processor applied to a navigation system, for example, Japanese Unexamined Patent Publication No. 2000-79860 describes a controller of a parking assistance system including an image recognizing apparatus, a graphic apparatus, and a central processing unit (CPU). Japanese Unexamined Patent Publication No. 2006-4217 describes a navigation main unit including an image recognizing unit, a graphic rendering unit, and a CPU. In each of a controller (16) in Japanese Unexamined Patent Publication No. 2000-79860 and a navigation main unit (14) in Japanese Unexamined Patent Publication No. 2006-4217, a data traffic amount or the like necessary for real-time display control, image recognition, and the like is not considered. It is not also suggested that the controller (16) or the navigation main unit (14) is formed on one chip.

SUMMARY OF THE INVENTION

The inventors of the present invention have examined reduction in the cost of a data processing system performing image recognition and display control on input image data. Since a memory used for image recognition and display control needs a large storage capacity, the inventors have found that it is important to form the data processor on one chip without mounting a large-capacity memory for the use. To realize it, first, the necessity of bus arbitration was found to assure real-time performance and assurance of a large data transfer amount (data traffic) in order to avoid a conflict of accesses to a large-capacity external memory. The real-time performance is such that a specific data process has to be completed within predetermined time. Heavy data traffic will be also simply referred to as high data bandwidth.

The matters examined by the inventors with respect to the point will be described. When real-time performance of an access to display data of the display controller cannot be assured, data in a buffer in the display controller becomes empty, and a display screen becomes distorted. When real-time performance cannot be assured for operation of storing image data received by the image input unit into a memory, the buffer in the image input unit overflows, so that a loss occurs in the fetched image data. In the case where real-time performance cannot be assured for fetch of image data to be recognized by the image recognizing module, image recognition cannot be performed every display frame. The image recognition can be performed only intermittently in display frames, so that the image recognition precision deteriorates.

Generally, to satisfy both of real-time performance and high data bandwidth, for example, the highest priority is placed on some real-time modules requested to have the real-time performance to assure real-time performance in memory accesses of the modules. Modules requested to have high data bandwidth are handles equivalent to a CPU and a graphic module, not equivalent to the real-time modules, and it is sufficient to perform bus arbitration by round robin. The image recognizing module has to read/write image data of some screens per frame, and requires both the real-time performance and the high data bandwidth. In the case of assuring the real-time performance by placing the highest priority on the image recognizing module as well as the display controller and the image data input unit to address the request for the real-time performance, the periods in which those circuits occupy the bus right are concentrated, and the modules requiring no real-time performance such as the CPU and the graphic module (non-real-time modules) cannot assure necessary data bandwidths. On the other hand, when the image recognizing module is handled equivalent to the CPU and the graphic module and the bus arbitration is performed by round robin, the real-time performance cannot be assured. Therefore, in the data processing system using the real-time module such as the display controller, the high data bandwidth module such as the graphic control module, and the image recognizing module requiring both the real-time performance and the high data bandwidth, to satisfy the requests, the image recognizing module has to be formed on a chip different from a chip on which the real-time modules and the high data bandwidth modules are formed, and a dedicated memory has to be provided for the image recognizing module.

Second, it was found out that, in the case of performing the image recognition and display control by one chip, a function capable of flexibly converting the format of image data in the chip in accordance with the format of input image data has to be mounted. Specifically, from the viewpoint of reducing a data process amount for image recognition, it is convenient to handle image data in the YUV format. On the other hand, it is suitable to handle image data in the RGB format in a graphic process using a recognition result. Similarly, also in the image display control, it is suitable to handle image data in the RGB format. Moreover, the case of also dealing with external input image data in any of the YUV format and the RGB format is also assumed.

An object of the present invention is to provide a data processor contributing reduction in the cost of a system performing image recognition and display control on input image data.

Another object of the invention is to form a data processor performing image recognition and display control on input image data by one chip.

The above and other objects and novel features of the invention will become apparent from the description of the specification and the appended drawings.

Outline of representative ones of the inventions disclosed in the specification will be briefly described as follows.

1. A data processor (1) according to the invention includes a central processing unit (7), a graphic controller (8), a display controller (3), an image recognizing module (2), a memory controller (15) capable of controlling an access to an external memory (17) coupled on the outside, and an image data input unit (4, 5) for inputting image data from the outside and capable of performing necessary format conversion on the image data. Those components are formed on a single semiconductor substrate. The display controller performs display control on the image data read from the external memory via the memory controller. The image data input unit stores the image data input from the outside or the image data subjected to the necessary format conversion into a first area (FB1, FB10, FB15, FB20, FB22, FB27, or FB33) in the external memory via the memory controller. The graphic controller or the central processing unit performs an image process such as distortion correction or bird's eye view process by using data stored in the first area, and stores the processed data in a second area in the external memory. The image recognizing module executes an image process using the image data in the first area or image data in a second area, obtained by performing necessary data process on the image data, and stores a result of the process in a third area (FB2, FB3, FB4, FB12, FB18, FB24, FB30, or FB36) in the external memory. In the above configuration, the data processor is formed in a single semiconductor integrated circuit so that an external memory can be commonly used for display control, image data input, and image recognition, so that the invention contributes to reduction in the cost of the data processor and a data processing system using the data processor. By the function of converting the format of input image data from the outside and the data processing function accompanying the image process for image recognition, the system can be adapted to a plurality of data formats of input image data.

RGB Converting Function for Display

As a concrete mode of the invention, the image recognizing module or the central processing unit performs image recognition using the image data in the first area or the image data in the second area subjected to necessary data process, and stores the result in a third area. The graphic controller stores graphic data in the RGB format in a fourth area (FB5, FB13, FB19, FB25, FB31, or FB37) in the external memory on the basis of the result of the image recognition stored in the third area.

The display controller can output the image data stored in the first area or the image data in the RGB format in the second area obtained by performing necessary format conversion on the image data in the first area, and graphic data (result of arithmetic process using data subjected to the recognizing process) in the fourth area so as to be overlaid on a display coupled on the outside. As a result, the result of image recognition performed on an image in the YUV format input from the outside and the input image in the RGB format can be displayed on the display.

Bus Arbitration

As another concrete mode of the invention, the data processor has: a first bus (BUS1) to which the image recognizing module, the image data input unit, and the display controller are coupled; and a second bus (BUS2) to which the central processing unit and the memory controller are coupled. The data processor further includes: a first arbitration circuit (ARB1) for arbitrating bus requests from the circuits coupled to the first bus; and a second arbitration circuit (ARB2) for arbitrating a result of the arbitration of the first arbitration circuit and bus requests from the other circuits. With the configuration, bus arbitration is performed between the result of the bus arbitration among the real-time modules and a bus request from another circuit. Thus, the situation that the bus right is not given to a non-real-time module can be easily avoided.

As further another concrete mode of the invention, the data processor further includes a control register, and each of the first and second arbitration circuits can change an arbitration control mode in accordance with a set value in the control register.

For example, when a first value is set in the control register (TypA), the first arbitration circuit arbitrates a conflict of bus requests from bus masters coupled to the first bus by round robin. The second arbitration circuit arbitrates a conflict of bus requests from a plurality of bus masters coupled to the second bus by round robin, and arbitrates a conflict between the arbitration result and a result of arbitration of the first arbitration circuit by round robin. Since the round robin is employed for each of bus arbitration among real-time modules, bus arbitration among non-real-time modules, and arbitration of the arbitration results, assurance of the real-time performance of the real-time modules coupled to the first bus, suppression of drastic decrease in the data bandwidth of the non-real-time modules coupled to the second bus, and assurance of high data bandwidth of the image recognizing module coupled to the first bus can be realized.

When a second value is set in the control register (TypB), the first arbitration circuit arbitrates a conflict of bus requests from the image data input unit and the display controller coupled to the first bus by round robin. The second arbitration circuit arbitrates a conflict of bus requests from the plurality of bus masters coupled to the second bus by first round robin, arbitrates a conflict between the arbitration result of the first round robin and a bus request from the image recognizing module by second round robin, and performs priority level control placing higher priority on the arbitration result of the first arbitration circuit with respect to a conflict between the arbitration result of the first arbitration circuit and the arbitration result of the second round robin. With the configuration, as compared with the case where the first value is set, the data bandwidth which can be obtained by a non-real-time module decreases, and the data bandwidth which can be obtained by the image recognizing module increases.

When a third value is set in the control register (TypC), the first arbitration circuit arbitrates a conflict of bus requests from the image recognizing module and the display controller coupled to the first bus by round robin. The second arbitration circuit arbitrates a conflict of bus requests from a plurality of bus masters coupled to the second bus by first round robin and, with respect to a conflict among the arbitration result of the first arbitration circuit, the arbitration result of the first round robin, and a bus request from the image recognizing module, performs priority level control placing highest priority on the arbitration result of the first arbitration circuit and placing the second highest priority on the bus request from the image recognizing module. With the configuration, as compared with the case in which the second value is set, the data bandwidth which can be obtained by the non-real-time module decreases, and the data bandwidth which can be obtained by the image recognizing module increases.

2. A data processor (1) according to another aspect of the invention includes a central processing unit (7), a graphic controller (8), a display controller (3), an image recognizing module (2), a memory controller (15) capable of controlling an access to an external memory (17) coupled on the outside, and an image data input unit (4, 5) for inputting image data from the outside and capable of performing necessary first format conversion on the image data, and those components are formed on a single semiconductor substrate. The display controller performs display control on the image data read from the external memory via the memory controller. The image recognizing module can execute an image process using the image data stored in the external memory. With the configuration, the data processor is formed in a single semiconductor integrated circuit so that an external memory can be commonly used for display control, image data input, and image recognition, so that the invention contributes to reduction in the cost of the data processor and a data processing system using the data processor. By the function of converting the format of input image data from the outside and the data processing function accompanying the image process for image recognition, the system can be adapted to a plurality of data formats of input image data.

YUV Data Process

As one concrete mode of the invention, the image data input unit stores image data input from the outside or image data subjected to the necessary first format conversion into a first area (FB1, FB10, FB15, FB20, FB22, FB27, or FB33) in the external memory via the memory controller. The image recognizing module executes an image process using the image data in the first area or image data in a second area subjected to necessary data process, and stores the result of the process in the third area (FB2, FB3, FB4, FB12, FB18, FB24, FB30, or FB36) in the external memory.

As further another concrete mode, the image process is a filter process of extracting an edge of an image using, as image data subjected to the first format conversion, image data of Y data obtained by converting the format of image data in the YUV format.

As further another concrete mode, the image recognizing module or the central processing unit performs image recognition using the image data in the first area or the image data in the second area subjected to necessary data process, and stores the result in the third area. The graphic controller stores graphic data in the RGB format in a fourth area (FB5, FB13, FB19, FB25, FB31, or FB37) in the external memory on the basis of the result of the image recognition.

As further another concrete mode, the display controller can convert data in the YUV format stored in the first area to image data in the RGB format, and output the converted image data in the RGB format to a display coupled on the outside. The display controller can also output the converted image data in the RGB format and image data in the fourth area so as to be overlaid on the display coupled on the outside.

Format Conversion

As one concrete mode of the invention, the image data input unit has a first format converter (4A or 5A) for performing the first format conversion. The first format converter has various conversion functions of conversion of image data from the YUV format to the RGB format, conversion of image data from the RGB format to the YUV format, and conversion of image data from the YUV format to Y data.

As one concrete mode of the invention, the central processing unit and the graphic controller can perform distortion correction or bird's eye view process on image data in the RGB format stored in the first area or image data of Y data, and further include a second format converter (10) for converting the image data in the RGB format subjected to the distortion correction or bird's eye view process to image data in the YUV format. The distortion correction or bird's eye view process and the format conversion by the second format converter are the necessary data process.

As one concrete mode of the invention, the display controller has a third format converter (3A) for performing the second format conversion. The third format converter has a function of converting image data from the YUV format to the RGB format and a function of adding UV data to image data of Y data.

Bus Configuration

As one concrete mode of the invention, the data processor further includes: a first bus (BUS1) to which the image recognizing module, the image data input unit, and the display controller are coupled; and a second bus (BUS2) to which the central processing unit and the memory controller are coupled. The graphic controller stores image data in the external memory via the memory controller in response to an instruction from the central processing unit. The display controller outputs image data read from the external memory via the memory controller to a display on the outside.

Bus Arbitration_TypA

As further another mode, the data processor further includes a first arbitration circuit (ARB1) and a second arbitration circuit (ARB2). The first arbitration circuit arbitrates a conflict of bus requests from the bus masters coupled to the first bus by round robin. The second arbitration circuit arbitrates a conflict of bus requests from the bus masters coupled to the second bus by round robin, and arbitrates a conflict between the arbitration result and an arbitration result of the first arbitration circuit by round robin. Since the round robin is employed for each of bus arbitration among real-time modules, bus arbitration among non-real-time modules, and arbitration of the arbitration results, assurance of the real-time performance of the real-time modules coupled to the first bus, suppression of drastic decrease in the data bandwidth of the non-real-time modules coupled to the second bus, and assurance of high data bandwidth of the image recognizing module coupled to the first bus can be realized.

As further concrete mode, the second arbitration circuit performs a control of setting maximum bus wait time for a bus request permitted to use the bus to a specified data amount, so that the bus occupation time of one bus master does not become too long.

As further concrete mode, the second arbitration circuit performs arbitration by round robin by assigning a plurality of time slices to a bus request from the display controller to improve the real-time performance of the display control.

Bus Arbitration_TypB

As further another concrete mode, the data processor further includes a first arbitration circuit and a second arbitration circuit. The first arbitration circuit arbitrates a conflict of bus requests from the image data input unit and the display controller coupled to the first bus by round robin. The second arbitration circuit arbitrates a conflict of bus requests from bus masters coupled to the second bus by first round robin, arbitrates a conflict between the arbitration result of the first round robin and a bus request from the image recognizing module by second round robin, and performs priority level control placing higher priority on the arbitration result of the first arbitration circuit with respect to a conflict between the arbitration result of the first arbitration circuit and the arbitration result of the second round robin. With the configuration, as compared with the bus arbitration of type A, the data bandwidth which can be obtained by the non-real-time module decreases, and the data bandwidth which can be obtained by the image recognizing module increases.

Bus Arbitration_TypC

As further another concrete mode, the data processor further includes a first arbitration circuit and a second arbitration circuit. The first arbitration circuit arbitrates a conflict of bus requests from the image recognizing module and the display controller coupled to the first bus by round robin. The second arbitration circuit arbitrates a conflict of bus requests from bus masters coupled to the second bus by first round robin and, with respect to a conflict among the arbitration result of the first arbitration circuit, the arbitration result of the first round robin, and the bus request from the image recognizing module, performs priority level control placing highest priority on the arbitration result of the first arbitration circuit and placing the second highest priority on the bus request from the image recognizing module. With the configuration, as compared with the bus arbitration of type B, the data bandwidth which can be obtained by the non-real-time module decreases, and the data bandwidth which can be obtained by the image recognizing module increases.

Effects obtained by the representative ones of the inventions disclosed in the specification will be briefly described as follows.

The data processor according to the invention contributes to reduction in the cost of the system performing image recognition and display control on input image data. The data processor performing image recognition and display control on input image data can be formed by a single chip.

BRIEF DESCRIPTION OF THE DRAWINGS

FIG. 8 is a diagram illustrating data bandwidths calculated according to arbitration methods of FIGS. 4, 6, and 7.

FIG. 12 is a diagram showing examples of combinations of an image format converting process in the case of inputting image data in the YUV format in FIG. 9.

FIG. 13 is a diagram showing examples of combinations of the image format converting process in the case of inputting image data in the RGB format in FIG. 9.

DETAILED DESCRIPTION OF THE PREFERRED EMBODIMENTS

Image Data Processor

Figure 1:
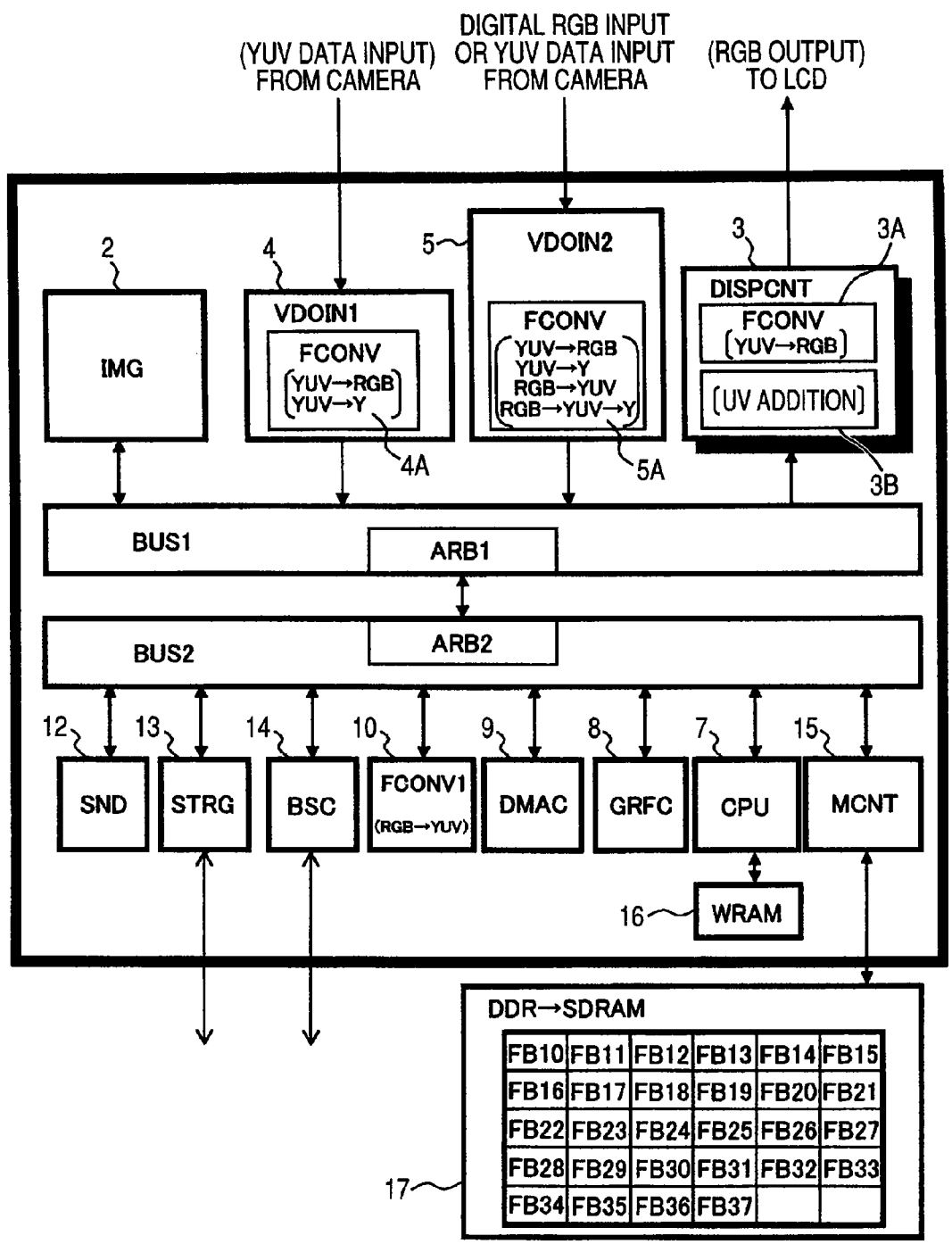
FIG. 1 is a block diagram of an image data processor to which the invention is applied.

FIG. 1 shows an image data processor to which the invention is applied. An image data processor 1 shown in the diagram is formed by mounting various accelerators and the like for performing an image process on a single semiconductor substrate made of single crystal silicon or the like as an SOC (System On Chip) by, for example, a complementary MOS integrated circuit manufacturing technique. Although not limited, the image data processor 1 is applied to various image processes in an in-vehicle navigation system.

The image data processor 1 has, as internal buses, for example, a first bus BUS1 and a second bus BUS2. To the first bus BUS1, an image recognizing process accelerator (IMG: image recognizing module) 2 requested to have high data bandwidth and real-time performance, a display controller (DISPCNT) 3 particularly requested to have real-time performance, an image data input unit (VDOIN1) 4 and an image data input unit (VDOIN2) 5 are coupled as bus master modules. To the second bus BUS2, as non-real-time bus master modules requiring a certain data bandwidth, a central processing unit (CPU) 7, a graphic processor (GRFC) 8, a direct memory access controller (DMAC) 9, and an image data format converter (FCONVM1) 10 are coupled. To the second bus BUS2, as bus slave modules, a sound accelerator (SND) 12, a storage interface circuit (STRG) 13 such as ATAPI or USB, a bus state controller (BSC) 14 for performing interface control with a general outside bus, and a memory controller (MCNT) 15 are coupled. A work RAM (WRAM) 16 made by a small-capacity SRAM (Static Random Access Memory) or the like is coupled to the CPU 7. The bus master module denotes a circuit module issuing a bus access request. The bus slave module denotes a circuit module sending a bus response to the bus request.

The memory controller 15 can access a DDR-SDRAM (Double Data Rate Synchronous DRAM) 17 coupled on the outside of the image data processor 1 in response to a bus request from the bus mater. To/from the DDR-SDRAM 17, read data and write data can be output/input synchronously with both of a leading edge and a trailing edge of a synchronous clock. For example, in the case of operation synchronized with a clock of 300 MHz at the maximum, when the number of parallel input/output data bits is 4 bytes (32 bits), the substantial maximum data traffic amount is about 1 gigabyte/second. The DDR-SDRAM 17 is used, as a common memory of the image data processor 1, as a frame buffer of image data, graphic data, and the like, a program memory, a work area, and the like.

To the image data input unit 4, image data in the YUV format is input from an external video camera or the like. To the image data input unit 5, image data in the YUV format from an external video camera or the like and image data in the digital RGB format is input. The image data input units 4 and 5 have format converters (FCONV) 4A and 5A, respectively, for converting the format of input image data as necessary. The format converter 4A can perform format conversion (YUV→RGB) from YUV to RGB and format conversion (YUV→Y) from YUV to Y data (luminance data). The format converter 5A can perform format conversion (YUV→RGB) from YUV to RGB, format conversion (YUV→Y) of extracting a luminance signal Y from YUV, format conversion (RGB→YUV) from RGB to YUV, and format conversion (RGB→YUV→Y) from RGB to YUV and from YUV to Y data. The image data input units 4 and 5 inputs image data entered from the outside and further image data obtained by performing required format conversion on the input image data into the DDR-SDRAM 17. Each of the image data input units 4 and 5 has a dedicated image data input terminal as an external terminal. The image data input units 4 and 5 can receive and process different image data in parallel.

The image recognizing process accelerator 2 performs a filtering process for making, for example, an edge of an image identifiable on image in the YUV format or image data of Y data (monochrome image data). The image as a result of the filtering process is recognized by, for example, the CPU 7. In the case of reducing the burden of image recognition on the CPU 7 as well, a CPU dedicated to the image recognition is additionally provided and an image recognizing module can be formed by the dedicated CPU and the image recognizing process accelerator 2.

The display controller 3 has, as an external terminal, a dedicated image data output terminal, issues a bus request to the DDR-SDRAM 17 at a display timing of a liquid crystal display (LCD-DSP) coupled on the outside or the like, and receives image data or graphic data stored in a frame buffer in the DDR-SDRAM 17. The input data is subjected to necessary format conversion and the resultant data is output to a display such as the liquid crystal display (LCD-DSP). The display controller 3 has, to perform the format conversion, a format converter (FCONV) 3A for converting image data in the YUV format to data in the RGB format and a UV adding circuit 3B for adding a color difference signal UV to image data of Y data, thereby converting the image data to a color image in the YUV format. Although not limited, the display controller 3 performs multilayer display control of overlaying a plurality of layers, and can perform a process of overlaying layers of different image data and graphic data. Specifically, a plurality of frame buffers are provided for respective layers and, at the time of performing the multilayer display, data of the plurality of frame buffers is overlaid and output to a display.

The operation modes of the image recognizing process accelerator 2, display controller 3, and image data input units 4 and 5 are initially set by the CPU 7. The operation of the image recognizing process accelerator 2 starts, for example, in response to a command issued by the CPU 7. The operation of the display controller 3 is performed, for example, synchronously with an image display timing. The operation of the image data input units 4 and 5 starts, for example, synchronously with an input of image data.

The graphic processor 8 stores graphic data in the frame buffer in the DDS-SDRAM 17 in accordance with an instruction of the CPU 7. For example, the graphic processor 8 stores a graphic image instructed in accordance with the image recognition result into the frame buffer, performs a distortion correcting process on input image data, stores the distortion corrected input image data into the frame buffer, performs a bird's-eye view process on the input image data, and stores the data subjected to the bird's eye view process in the frame buffer. Obviously, the graphic processor 8 can be used for storing map data or the like in accordance with an instruction of the CPU 7. For example, the graphic processor 8 receives an image recognition result indicative of a recognized matter and coordinate data of the recognized matter from the CPU 7, performs a drawing process in accordance with the setting of the CPU 7, and stores, as image data in the RGB format, a mark, pattern, or the like for emphasizing the recognized matter into the frame buffer.

In the case of recognizing the image data in the RGB format subjected to the distortion correction and the bird's eye view process, the image data has to be converted to image data in the YUV format. For the format conversion, the format converter (FCONV1) 10 is used. In the case where image data subjected to the distortion correction and the bird's eye view process is only Y data, the format conversion by the format converter (FCONV1) is not performed.

The central processing unit (CPU) 7 performs the control on the whole image data processor 1. The CPU 7 has an instruction control unit for controlling an instruction executing sequence, an executing unit for performing an arithmetic control and bus access operation for executing the instruction in accordance with a control signal generated by the instruction control unit, a cache memory of an instruction and data, and an address conversion buffer used for conversion of a virtual address and a physical address. The OS (Operating System) and an application program of the CPU 7 are, although not limited, stored in the program area in the DDR-SDRAM 17.

The first and second buses BUS1 and BUS2 may employ, for example, an address/data bus format made of a signal line groups of address, data, and control signals, or a split transaction bus format of transmitting/receiving, as packets, information such as necessary data and addresses. The first bus BUS1 has a first arbitrary circuit ARB1, and the second bus BUS2 has a second arbitrary circuit ARB2. The first arbitrary circuit ARB1 performs arbitration in response to a bus request from a bus master coupled to the first bus BUS1. The second arbitrary circuit ARB2 performs arbitration in accordance with the arbitration result of the first arbitrary circuit ARB1 and a bus request from another circuit. In the case of employing the address/data bus format, the arbitrary circuit makes a circuit allowing a bus request exclusively occupy the bus in accordance with a predetermined arbitration logic. In the case of employing the split transaction bus format, the arbitration circuit places priorities on bus requests in accordance with a predetermined arbitration logic, and performs a control of sending back a bus response to the corresponding circuit in accordance with the priority.

The image data processor 1 has a characteristic configuration with respect to the bus arbitration and data format conversion in association with the formation of the image recognizing process accelerator 2 requested to have high data bandwidth and real-time performance on a chip, and a structure such that the modules 3, 4, and 5 requested to have real-time performance and the non-real-time modules 7, 8, 9, and 10 requested to have a certain data bandwidth coexist on the same chip and a plurality of bus master modules formed on the chip share the external DDR-SDRAM 17. The characteristic configuration will be described in detail hereinbelow.

Image Recognizing Process

Figure 2:
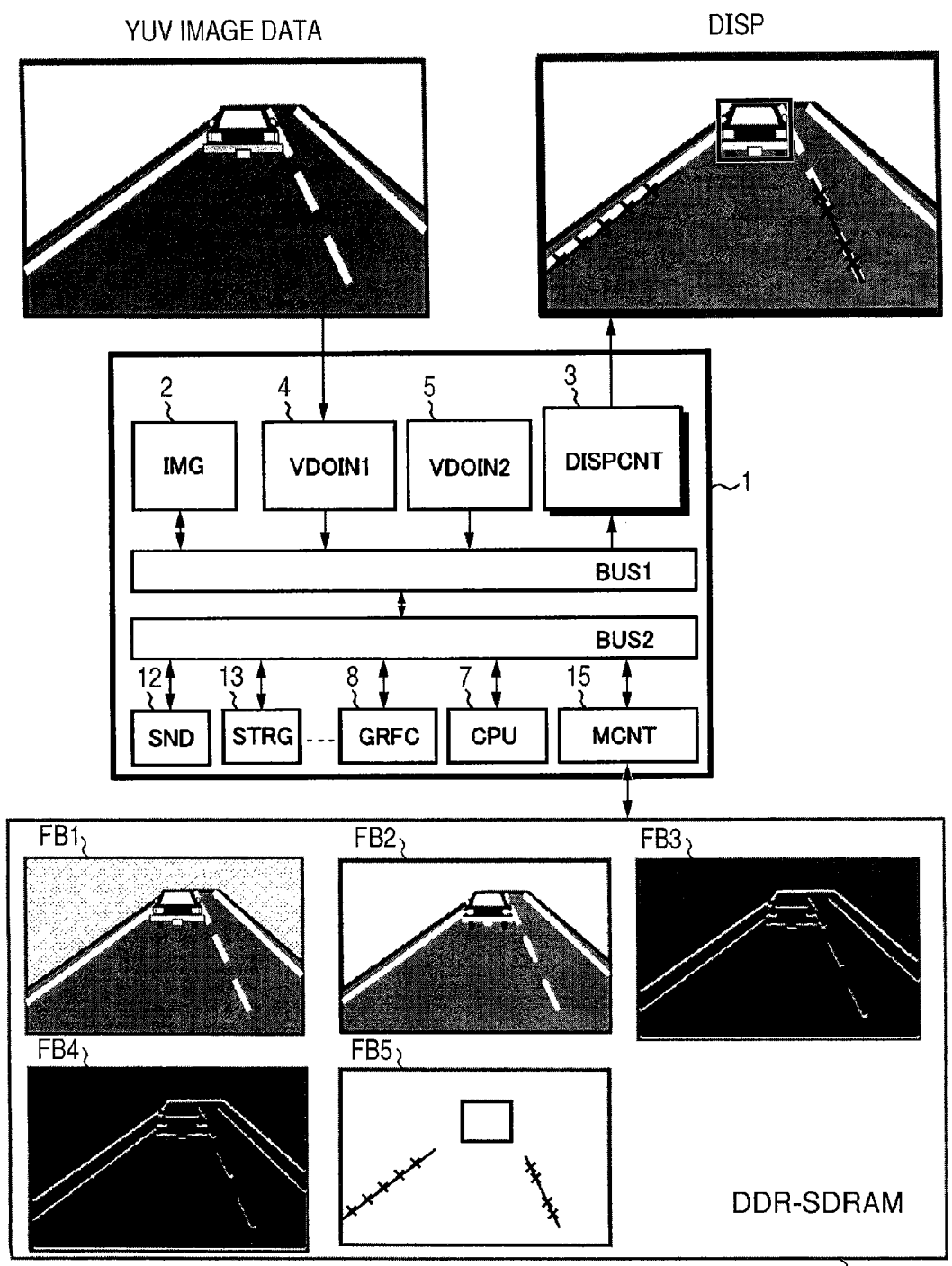
FIG. 2 is a diagram illustrating an example of an image recognizing process.

FIG. 2 shows an example of the image recognizing process. A process of recognizing images from a camera provided at the head of a vehicle will be described as an example. First, when image data in the YUV format is supplied from the camera to the image data input unit 4, the image data input unit 4 converts the image data in the YUV format to image data (monochrome image data) in the format of only Y data by using the format converter 4A, and writes the resultant image data into a frame buffer FB1 in the DDR-SDRAM 17. Next, the image recognizing process accelerator 2 reads the image data in the format of only Y data (hereinbelow, also simply written as Y-format image data) written in the frame buffer FB1, performs a filter process such as a process of removing noise without blurring the edges of an image by a median filter process, and writes the result of the filter process into a frame buffer FB2. In the process, in an internal register of the image recognizing process accelerator 2, the write start address, the stride, and sizes in the x and y directions of performing an image process are set from the CPU 7. According to the set value, the write address in the frame buffer is incremented by the size of transfer data per time to the DDR-SDRAM 17. For example, when the write start address is H' 1000_0000, the stride is H' 200, and the sizes in the x and y directions of an image process are x=H' 100 and y=H' 5, respectively, and the size of transfer data per time in the memory is 128 bytes, the write address is generated as H' 1000_0000, H' 1000_0080 (after completion of the first line in the frame buffer), H' 1000_0200, H' 1000_0280 (after completion of the second line in the frame buffer), H' 1000_ 0400, . . . , and H' 1000_0880 (after completion of the fifth line in the frame buffer).

The image recognizing process accelerator 2 reads the corrected Y image data stored in the frame buffer FB2 in the DDR-SDRAM 17, and performs an edge extracting process. The image recognizing process accelerator 2 writes the Y-format image data of the extracted edge into a frame buffer FB3 in the DDR-SDRAM 17. Further, the image recognizing process accelerator 2 reads the Y-format image data written in the frame buffer FB3, performs binarizing process, and stores binary image data obtained by the binarizing process into a frame buffer FB4 in the DDR-SDRAM 17.

The image recognizing process accelerator 2 notifies the CPU 7 of the end of the image process. According to an image recognizing algorithm specified in an image recognizing application, the CPU 7 which receives the end of the image process reads binary image data in the frame buffer FB4 and recognizes lanes and a vehicle on the front side. The image recognizing algorithm specifies decisions such that some groups of white pixels in a binary image are inclined in a specific direction or a correlation value of a shape is close to an object to be recognized. On the basis of the decisions, the CPU 7 obtains information of an object recognized and the coordinates of the recognized object. The CPU 7 sends the information to the graphic processor 8 to store graphic data in the RGB format for emphasizing the recognized object into a frame buffer FB5 in the DDR-SDRAM 17. For example, the stored graphic data is of emphasis lines for emphasizing the contour of the vehicle on the front side and the lanes.

The display controller 3 reads the Y-format image data stored in the frame buffer FB1 or FB2 in the DDR-SDRAM 17 and the graphic data stored in the frame buffer FB5. The display controller 3 adds UV data by using the UV adding circuit 3B to the read Y-format image data, thereby generating image data in the YUV format. The image data in the YUV format is further converted to image data in the RGB format in the format converter 3A. The display controller 3 synthesizes the converted RGB image data and graphic data in the RGB format from the frame buffer FB5 in layers and displays the data on a display (DISP) coupled on the outside.

Objects to be recognized on an image are mainly a lane (white line), a vehicle on the front side, a vehicle on the rear side, a crosswalk, and marks on roads (arrows, speed limits, and the like). The image recognizing process accelerator performs the median filter process, the edge detecting process, and the binarizing process in the description of FIG. 2 and may perform other processes necessary for the image recognizing process at high speed, which are various filter processes such as γ correction and rank filter process, a histogram process, and a labeling process. The γ correction is a process of correcting a luminance value in accordance with a γ value correction table written in advance in a memory for concentration conversion in the image recognizing process accelerator by the CPU 7. Various filter processes can be performed by varying a weighting factor set in the internal register by a kernel (for example, a 7×7 matrix) as a unit of filtering a read image. The size of the kernel can be changed by a setting in the register. The histogram process is a process for obtaining a luminance value distribution in the Y-format image data. The result of the histogram process is stored in a histogram memory in the image recognizing process accelerator. The labeling process is a process of numbering white pixels in a binary image. When white pixels are lined vertically or horizontally, a line of the white pixels is regarded as one object, and plural numbers are not given.

The distortion correcting process and the bird's eye view process may be performed using the image data (monochrome image data) stored in the frame buffer FB1 by the graphic processor 8 or the CPU 7. The image data subjected to the distortion correcting process and the bird's eye view process may be stored in the frame buffer in the DDR-SDRAM 17, read by the image recognizing process accelerator 2, and undergo the filter process. The processes subsequent to the distortion correcting process and the bird's eye view process are similar to those described above.

In the example of FIG. 2, the image recognizing process cannot be performed only by the image recognizing process accelerator 2, and the CPU 7 is necessary. With respect to this point, the image recognition can be performed by providing a dedicated CPU in the image recognizing process accelerator 2 aside from the CPU 7 or by mounting the image recognizing process accelerator on the CPU 7 without using another CPU. In the example of FIG. 2, the image recognizing process accelerator 2 accesses the DDR-SDRAM 17 total six times; three times of reading and three times of writing. When one image data size is VGA (640×480 pixels), data of 1,843,200 bytes (one byte per pixel) is transmitted/received to/from the DDR-SDRAM 17. For example, when the image recognizing process accelerator 2 has to complete the series of processes within one frame (33.3 milliseconds), the data bandwidth of approximately 55.4 Mb/sec (=1,843,200÷0.0333) is requested. There is also the case of making the image recognizing process accelerator 2 further perform the filter process. Obviously, the image recognizing process accelerator 2 is requested to have both high bandwidth and real-time performance.

Bus Arbitration

Figure 3:
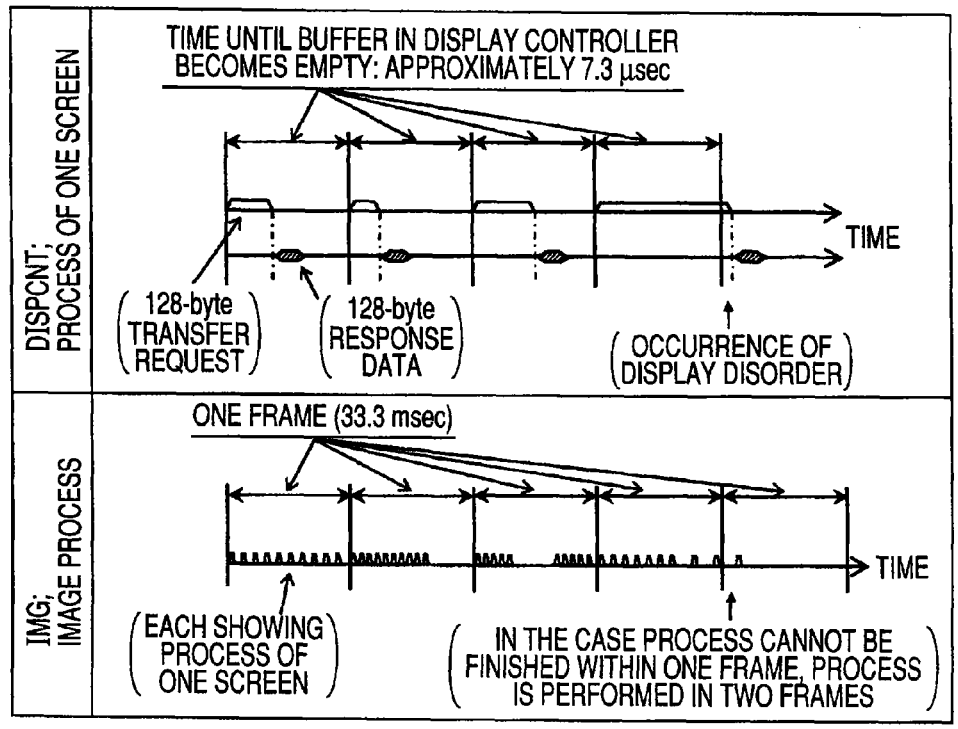
FIG. 3 is a diagram showing the difference in real-time performance between an image recognizing process accelerator and a display controller.

FIG. 3 shows the difference in real-time performance between the image recognizing process accelerator 2 and the display controller 3. The image recognizing process accelerator 2 processes about 10 to 13 screens in one frame (33.3 milliseconds). The display controller 3 has to issue a data transfer request as a bus request to the first bus BUS1, read data from the DDR-SDRAM 17, and supply the data to the display data buffer in the display controller 3 within time (about 7.3 microseconds) shorter than the process time of the image recognizing process accelerator 2 before the display buffer becomes empty. The data stored in the display data buffer is output to the liquid crystal display (LCD-DSP) coupled on the outside or the like at a predetermined timing (in this case, 7.3 microseconds). When data is not prepared for the display data buffer and cannot be output, a problem such as display distortion occurs. The limited time of the display controller is shorter than that of the image recognizing process accelerator 2, and higher processing seed is requested.

The arbitration circuits ARB1 and ARB2 arbitrate a conflict of bus requests to an access to the DDR-SDRAM 17 shared by the arbitration circuits ARB1 and ARB2 so as to satisfy both of real-time performance of the display controller 3 severer than that of the image recognizing process accelerator 2 and the high data bandwidth of the image recognizing process accelerator 2.

Figure 4:
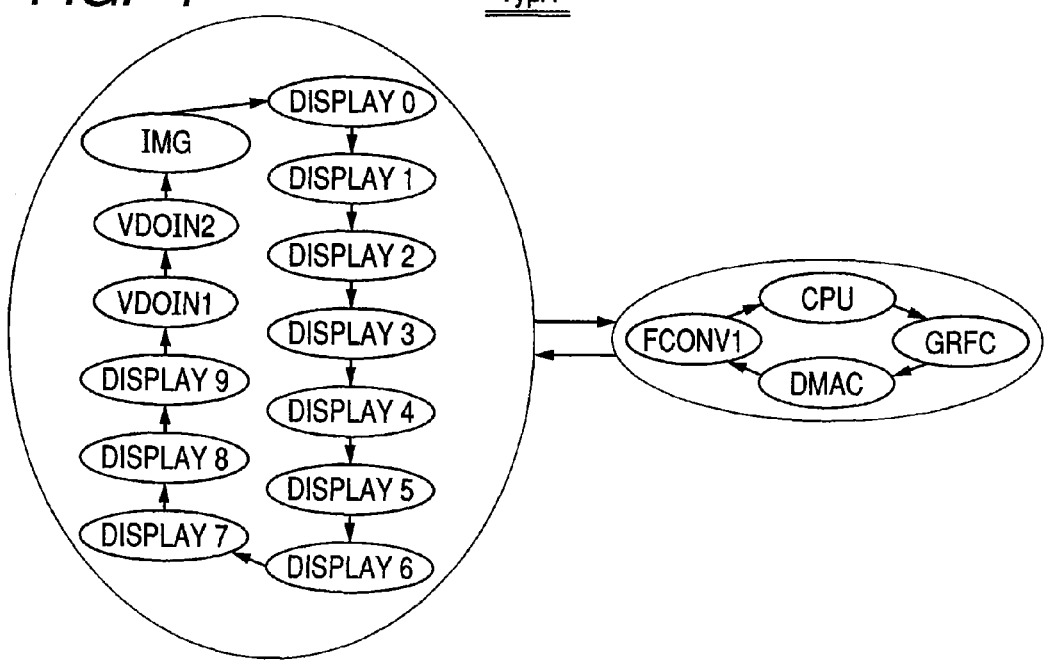
FIG. 4 is a diagram illustrating a first arbitration mode (TypA) of an arbitration circuit.

FIG. 4 shows a first arbitration mode of the arbitration circuits ARB1 and ARB2. In the first bus arbitration mode, the first arbitration circuit ARB1 arbitrates conflict of bus requests from the image recognizing process accelerator (IMG) 2, the image data input units (VDOIN1 and VDOIN2) 4 and 5, and the display controller 3 as bus masters coupled to the first bus BUS1 by round robin. The second arbitration circuit ARB2 arbitrates conflict of bus requests from the CPU 7, the DMAC 9, the graphic processor (GRF) 8, and the format converter (FCONV1) 10 as bus masters coupled to the second bus BUS2 by round robin, and arbitrates conflict between the arbitration result and an arbitration result of the first arbitration circuit ARB1 by round robin. The arbitration using round robin is performed by dynamically changing priorities on all of acceptable requests, changing the next priority of the permitted bus request to the lowest priority, and changing the priority of each of the other bus requests to higher priority by one. To a bus request from the display controller 3 most requested to have real-time performance, successive dynamic priorities of display 0 to display 9 are given in order to improve the real-time performance of display control. For each of the other circuit modules (VDOIN1, VDOIN2, IMG, CPU, GRF, DMAC, and FCONV1), a dynamic priority is given. The second arbitration circuit ARB2 performs a control of setting maximum bus wait time for a bus request permitted to use the bus to a specified data amount, for example, transfer of 128 bytes so that the bus occupation time of one bus master does not become too long.

Figure 5:
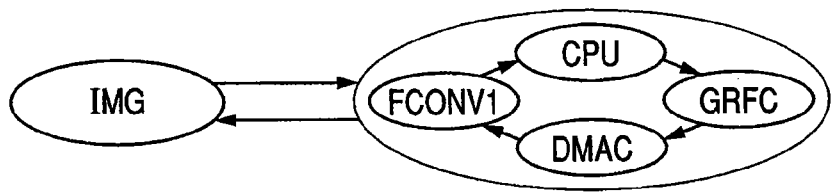
FIG. 5 is a diagram illustrating an equivalent arbitration mode in the case where a display controller and an image input unit do not issue a bus request.

An example of the arbitration result in the bus arbitration mode of FIG. 4 will be described. For example, when all of circuit modules to be arbitrated initially issue bus requests at the same time, and continuously issue bus requests, arbitration is performed so that the bus requests are permitted in order of display 0, CPU, display 1, GRFC, display 2, DMAC, display 3, FCONV1, display 4, CPU, . . . , VDOIN1, DMAC, VDOIN2, FCONV1, IMG, CPU, display 0, . . . . In reality, the display controller 3 and the image input units 4 and 5 do not continuously issue the bus requests, but issue requests every predetermined time. When the display controller 3 and the image input units 4 and 5 do not issue a bus request, the result of arbitration becomes equivalent to that shown in FIG. 5 for the reason that the circuit modules issuing no bus request are not regarded as objects of arbitration at that time. In this case, the arbitration is performed so that the bus requests are permitted in order of IMG, CPU, IMG, GRFC, IMG, DMAC, IMG, FCONV1, IMG, CPU, . . . .

Since round robin is employed in each of the bus arbitration among the real-time modules, the bus arbitration among the non-real-time modules, and arbitration for arbitration results of the bus arbitrations, each of assurance of the real-time performance of the real-time modules coupled to the first bus BUS1, suppression of sharp decrease in the data bandwidth of the non-real-time modules coupled to the second bus BUS2, and assurance of the high data bandwidth of the image recognizing process accelerator 2 coupled to the first bus BUS1 can be realized.

Figure 6:
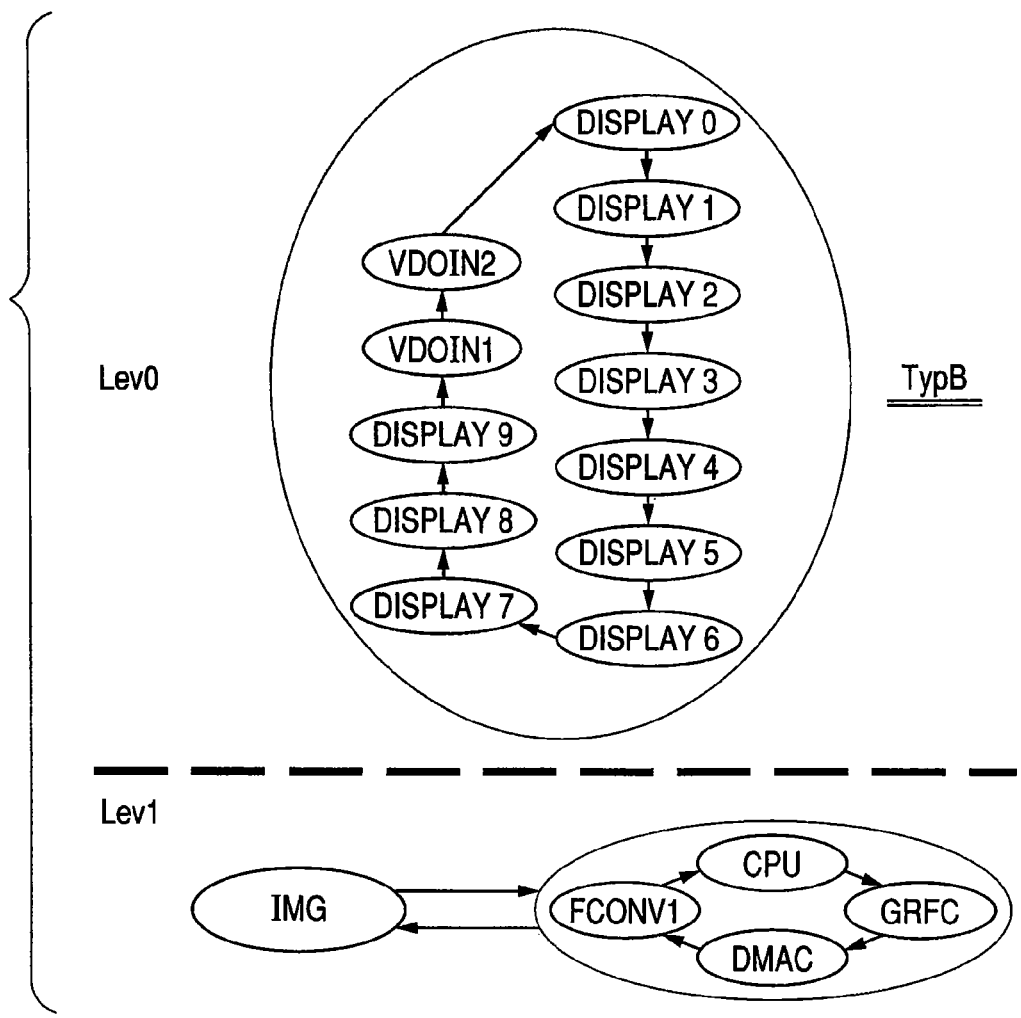
FIG. 6 is a diagram illustrating a second arbitration mode (TypB) partly using a fixed priority level as well.

FIG. 6 shows a second arbitration mode also using a fixed priority level partly. The first arbitration circuit ARB1 arbitrates conflict of bus requests from the image data input units 4 and 5 and the display controller 3 coupled to the first bus BUS1 by the round robin. The second arbitration circuit ARB2 arbitrates conflict of bus requests from the CPU 7, the DMAC 9, the graphic processor 8, and the format converter 10 as bus master modules coupled to the second bus BUS2 by first round robin, arbitrates conflict between the result of the arbitration using the first round robin and the bus request from the image recognizing process accelerator 2 by second round robin, and performs priority level control of giving higher priority to the arbitration result of the first arbitration circuit ARB1 for conflict between the result of arbitration of the first arbitration circuit ARB1 and the result of arbitration by the second round robin. First fixed priority (lev0) is higher than second fixed priority (Lev1).

An example of an arbitration result in the bus arbitration mode of FIG. 6 will be described. For example, when all of bus masters as objects of the arbitration initially issue bus requests at the same time and the image recognizing process accelerator 2, CPU 7, GRFC 8, DMAC 9, and FCONV1 continuously issue bus requests, arbitration is performed so that the bus requests are permitted in order of display 0, display 1, . . . , VDOIN1, VDOIN2, IMG, CPU, IMG, GRFC, IMG, DMAC, IMG, FCONV1, IMG, CPU, . . . . In this case as well, in a manner similar to FIG. 4, the display controller 3 and the image input units 4 and 5 issue the bus requests every predetermined time. Consequently, when the display controller 3 and the image input units 4 and 5 do not issue a bus request, the result of arbitration becomes equivalent to that shown in FIG. 5. As compared with the bus arbitration of FIG. 4, the data bandwidth which can be obtained by the non-real-time module decreases, and the data bandwidth which can be obtained by the image recognizing process accelerator 2 increases.

Figure 7:
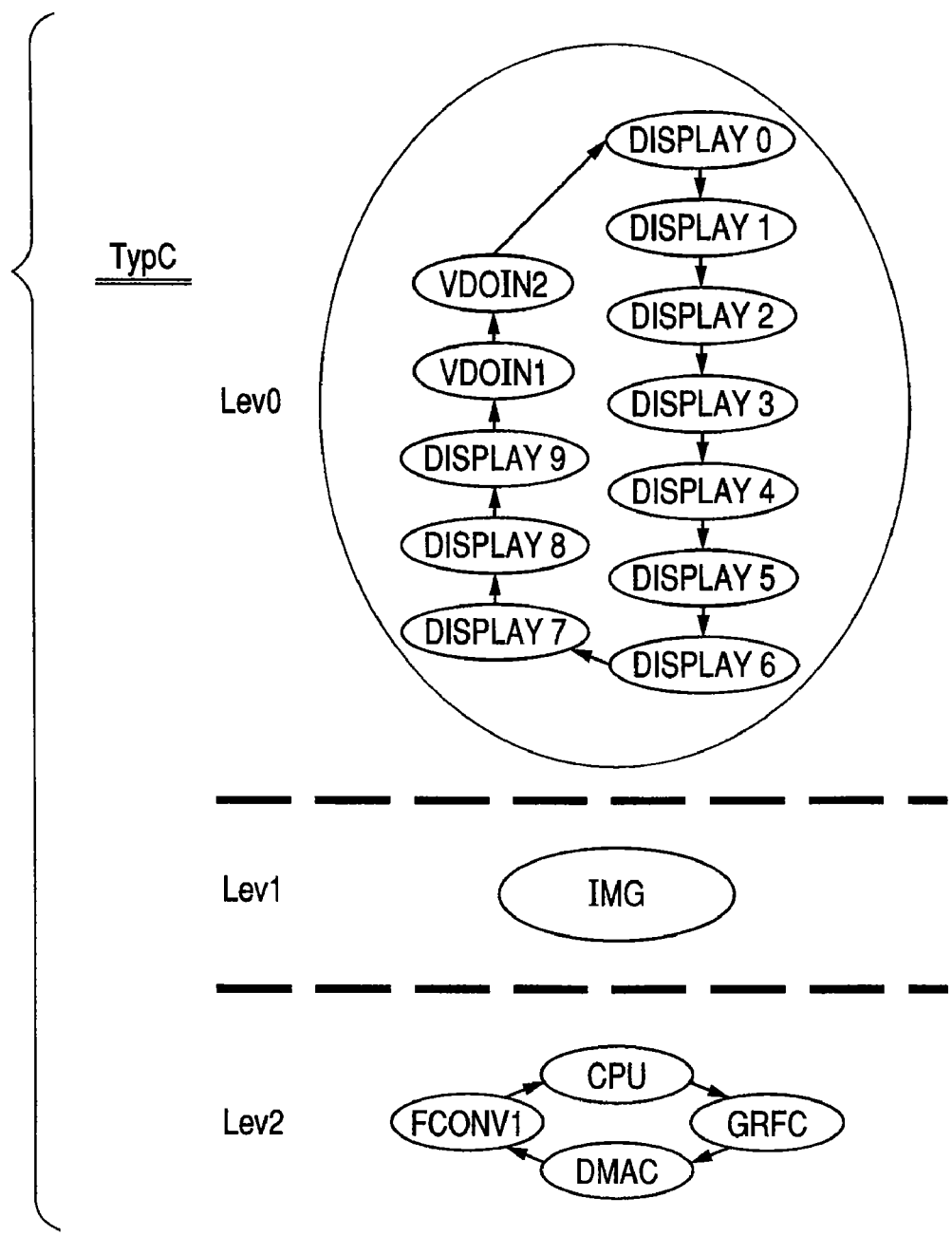
FIG. 7 is a diagram illustrating a third arbitration mode (TypC) partly using a deeper fixed priority level as well.

FIG. 7 shows a third arbitration mode partly using deeper fixed priority level. In the third bus arbitration mode, the first arbitration circuit ABR1 arbitrates conflict among bus requests from the image data input units 4 and 5 and the display controller 3 coupled to the first bus BUS1 by round robin. The second arbitration circuit ARB2 arbitrates conflict of bus requests from the CPU 7, the DMAC 9, the graphic processor 8, and the format converter 10 as bus master modules coupled to the second bus BUS2 by first round robin. For conflict among the result of the arbitration by the first arbitration circuit ARB1, the result of the arbitration using the first round robin, and the bus request from the image recognizing process accelerator 2, the priority level control is performed in which the highest priority (Lev0) is permitted to the result of arbitration of the first arbitration circuit ARB1, the second highest priority (Lev1) is permitted to the bus request from the image recognizing process accelerator 2, and the lowest priority level (Lev2) is permitted to the result of the arbitration using the first round robin.

An example of an arbitration result in the bus arbitration mode of FIG. 7 will be described. For example, when all of bus masters as objects of the arbitration initially issue bus requests at the same time (once), arbitration is performed so that the bus requests are permitted in order of display 0, display 1, . . . , VDOIN1, VDOIN2, IMG, CPU, GRFC, DMAC, and FCONV1. In this case, as compared with the bus arbitration of FIG. 6, the data bandwidth which can be obtained by the non-real-time module decreases, and the data bandwidth which can be obtained by the image recognizing module increases.

FIG. 8 shows data bandwidths calculated according to the arbitration methods of FIGS. 4, 6, and 7. As preconditions, the total data bandwidth between the memory controller 15 and the DDR-SDRAM 17 is set to 500 megabytes/second (Mb/sec), the display controller 3 requests 200 Mb/sec, the image input units 4 and 5 request 100 Mb/sec, and the transfer size ratio of the real-time module:non-real-time module=4:1. TypA denotes the arbitration mode of FIG. 4, TypB denotes the arbitration mode of FIG. 6, and TypC denotes the arbitration mode of FIG. 7. In the case of TypA and TypB, the image recognizing process accelerator 2, CPU 7, graphic processor 8, DMAC 9, and format converter (FCONV1) 10 continuously issue bus requests. In the case of TypC, the CPU 7, graphic processor 8, DMAC 9, and format converter (FCONV1) 10 continuously issue bus requests, and the image recognizing process accelerator 2 requests 180 Mb/sec.

In the case of an arbitration request of TypA in FIG. 8, the transfer size ratio of the real-time module and the non-real-time module is 4:1 (the transfer size of the real-time module is 128 bytes and that of the non-real-time module is 32 bytes/sec), so that the real-time module obtains 400 Mb/sec, and the non-real-time module obtains 100 Mb/sec. Since the display controller 3 requests 200 Mb/sec and the image data input units 4 and 5 request 100 Mb/sec, the bandwidth which can be obtained by the image recognizing process accelerator 2 is 100 Mb/sec. 100 Mb/sec is equally shared by the non-real-time modules, and each of the CPU 7, graphic processor (GRFC) 8, DMAC 9, and format converter (FCONV1) 10 can obtain the data bandwidth of 25 Mb/sec.

In the case of TypB in FIG. 8, first, the display controller 3 obtains 200 Mb/sec, and the image data input units 4 and 5 obtain 100 Mb/sec. The remaining 200 Mb/sec is shared by the image recognizing process accelerator 2, CPU 7, graphic processor (GRFC) 8, DMAC 9, and format converter (FCONV1) 10. Since the transfer size ratio between the real-time module and the non-real-time module is 4:1, the image recognizing process accelerator 2 obtains the data bandwidth of 160 Mb/sec, and each of the CPU 7, graphic processor (GRFC) 8, DMAC 9, and format converter (FCONV1) 10 can obtain the bandwidth of 10 Mb/sec.

In the case of TypC in FIG. 8, first, the display controller 3 obtains 200 Mb/sec, and the image data input units 4 and 5 obtain 100 Mb/sec. Next, the image recognizing process accelerator 2 obtains the bandwidth of 180 Mb/sec. The remaining 20 Mb/sec is equally shared by the CPU 7, graphic processor (GRFC) 8, DMAC 9, and format converter (FCONV1) 10. Each of the components can obtain the data bandwidth of 5 Mb/sec.

In any of the bus arbitration systems of TypA, TypB, and TypC, the real-time performance of the display controller 3 and the image data input units 4 and 5 can be assured. The data bandwidth of the CPU 7, graphic processor 8, DMAC 9, and format converter (FCONV1) 10 as the non-real-time modules can be assured. Further, the high real-time performance and the high data bandwidth of the image recognizing process accelerator 2 can be assured.

Any one of the bus arbitration systems of TypA, TypB, and TypC may be fixed or can be selected. For example, it is sufficient to provide a control register which can be accessed by the CPU 7 and set the arbitration control mode of the first and second arbitration circuits ARB1 and ARB2 to one of TypA, TypB, and TypC in accordance with the set value of the control register.

Data Format Conversion

Figure 9:
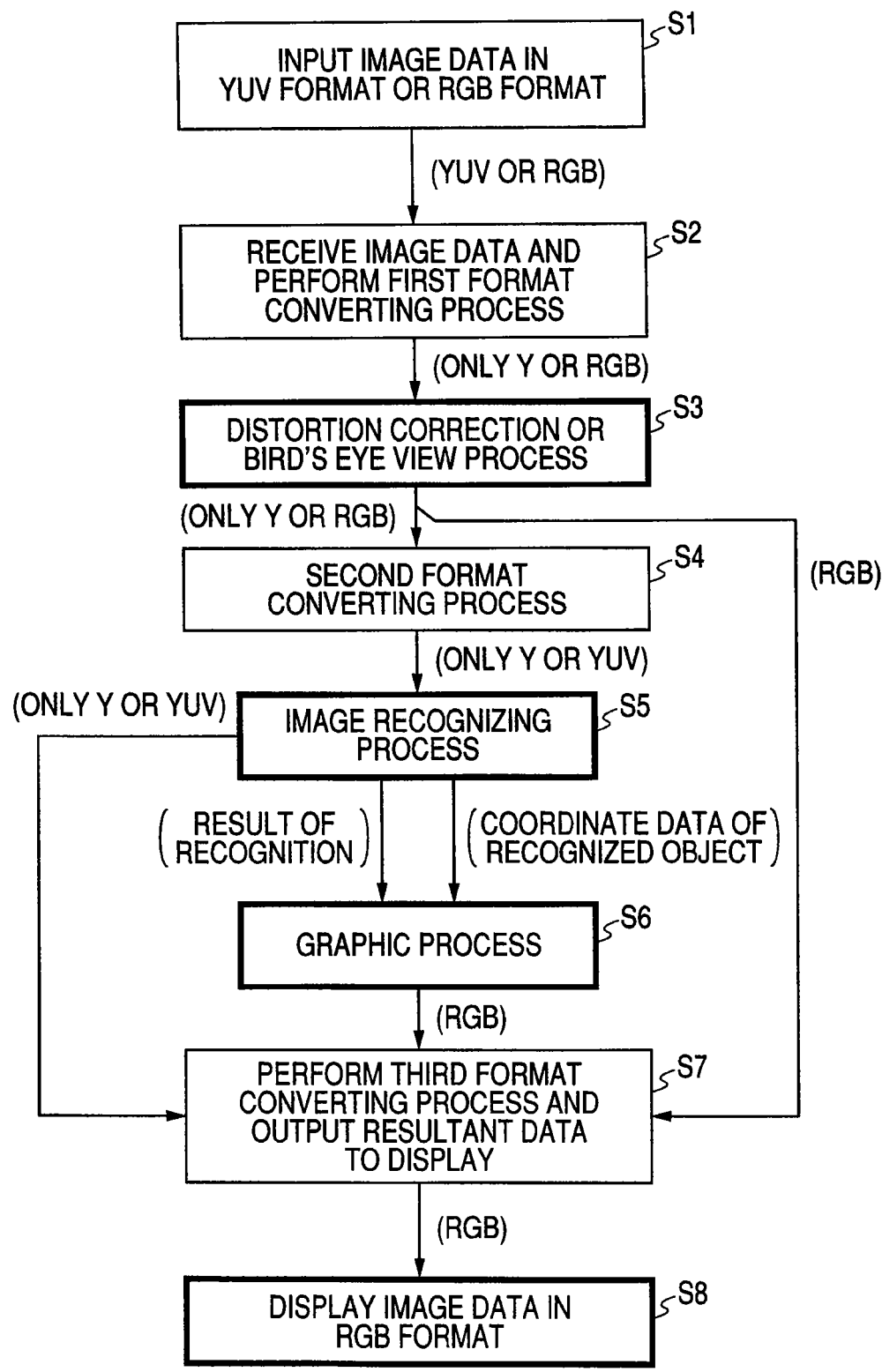
FIG. 9 is a flowchart generally showing image processes by an image data processor in accordance with the flow of data.
Figures 10, 11:
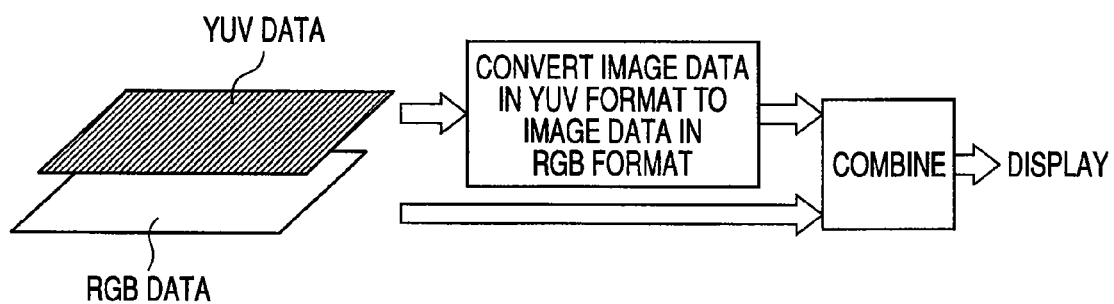
FIG. 10 is a diagram showing the correspondence between image processes and image data formats in the image data processor.
FIG. 11 is a diagram illustrating the flow of data in format conversion in the display controller and multilayer output.

FIG. 9 shows image processes performed by the image data processor 1 in accordance the flow of data. The distortion correction or the bird's eye view process (S3) performed by using the CPU 7 and the graphic processor 8 can be performed only with image data in the RGB format or in the format of only Y data. The image recognizing process (S5) can be performed only with image data in the format of only Y data or in the YUV format. The graphic process (S6) can be performed only with image data in the RGB format. The display controller 3 has to output image data in the RGB format to the display (S8). FIG. 10 shows the relations between the processes and the corresponding image formats. To realize the processes, the image data processor 1 has the plurality of format converters 3A, 3B, 4A, 5A, and 10.

To the image data processor 1, image data in the YUV format or the RGB format is supplied from an eternal video camera or the like (S1). The image data input units 4 and 5 can receive the supplied image data and perform the first format converting process (S2). In the first format converting process in step S2, image data in the YUV format can be converted to image data in the format of only Y data, or image data in the YUV format can be converted to image data in the RGB format. When the image data in the RGB format is taken, the first format conversion (S2) is not performed. The distortion correction or bird's eye view process (S3) is performed by the graphic processor 8 or CPU 7. In the second format converting process (S4), the image data subjected to the distortion correction or bird's eye view process is converted from the RGB format to the YUV format. In the case where the image data in the format of only Y data undergoes the distortion correction or the bird's eye view process, the second format conversion is not performed.

The image recognizing process (S5) is performed by, for example, the image recognizing process accelerator 2 and the CPU 7. The graphic process (S6) is performed by the graphic processor 8. The third format conversion and the display output process (S7) are performed by the display controller 3. In the third format converting process in step S7, process result data in the step S3, result data in the graphic process S6, and in-process result data (result data of the edge detecting process and γ correction) of the image recognizing process in S5 is input. In the third format converting process, UV data is added to image data in the format of only Y data, thereby obtaining image data in the YUV format, and the image data in the YUV format can be converted to image data in the RGB format. The display controller 3 can perform conversion from image data in the format of only Y data to image data in the YUV format, and conversion from the image data in the YUV format to image data in the RGB format. In the process in step S7, graphic data in the RGB format drawn on the basis of the image recognition result (S6) and the image data in the RGB format subjected to the distortion correction or the bird's eye view process in the process of step S3 can be output in multiple layers to the display. In the process in step S7, graphic data in the RGB format (S6) obtained from the result of the image recognizing process (S5) is overlaid on the image data in the format of only Y data subjected to the distortion correction or bird's eye view process in the process of step S3 or the YUV data obtained by the distortion correction or the bird's eye view process in the process of step S3 or format conversion in step S4, and the resultant data can be output in multiple layers to the display coupled on the outside. FIG. 11 shows an example of the flow of data in the format conversion and the output in multiple layers in the display controller 3.

FIG. 12 shows an example of combinations of the image format converting processes in the case where image data in the YUV format is input via the image data input units 4 and 5 in FIG. 9. FIG. 13 shows an example of combinations of the image format converting processes in the case where image data in the RGB format is input in FIG. 9. Obviously, as long as the conditions shown in FIG. 10 are satisfied, combinations other than the combinations of the format converting processes in FIGS. 12 and 13 are also possible.

As an example of a first combination of the format converting processes in FIG. 12, parking assistance or three-dimensional image recognition (to obtain distance to an object by using parallax) is assumed. Processes and the flow of data in the case of performing distortion correction on an image captured by a camera, recognizing an obstacle (vehicle or people) and white lanes (traffic lane and crosswalk), drawing a square, oval, or thick line in color on the obstacle (vehicle or people) and white lanes by the graphic processor 8, and superimposing the drawn square or the like on the LCD will be described.

First, image data in the YUV format is input from the outside, and the image data input units 4 and 5 fetch the image data. The YUV to Y conversion is performed in the first format converting process in S2, and the image data in the format of only Y is written in a frame buffer FB10 in the DDR-SDRAM 17. The image data in the format of only Y data written in the frame buffer FB10 is read, and the distortion correction or bird's eye view process is performed by the CPU 7 or the graphic processor 8. The resultant data is written in a frame buffer FB11 in the DDR-SDRAM 17. The image data in the format of only Y data does not undergo the second format conversion in S4. The image data in the format of only Y data written in the frame buffer FB11 is read by the image recognizing process accelerator 2, subjected to an image process such as a filtering process so that the image data can be recognized by the CPU 7, and the processed data is written in a frame buffer FB12 in the DDR-SDRAM 17. The CPU 7 reads the image data in the format of only Y data (or binary image data) stored in the frame buffer FB12, performs recognizing process, and passes the recognition result (indicative of a recognized object) and coordinate data of the recognized object (coordinate data for specifying coordinates in the image data of the recognized object) to the graphic processor 8. On the basis of the received recognition result and the coordinate data of the recognized object, the graphic processor 8 performs a drawing operation for emphasizing the recognized object and writes the resultant image as image data in the RGB format (such as marking or pattern) into a frame buffer FB13 in the DDR-SDRAM 17.

It is assumed that the in-progress image data in the format of only Y data subjected to the image recognizing process (the γ correction, the smoothing process, and the like) is stored in, for example, a frame buffer FB14. Since the image data in the format of only Y data stored in the frame buffer FB14 is image data subjected to the processes such as the γ correction and the smoothing process, obviously, the data is clearer than image data in the format of only Y data entered from an image data input unit, stored in the frame buffer FB10, and subjected to the format conversion, or image data in the format of only Y data subjected to the distortion correction or the bird's eye view process stored in the frame buffer FB11. The display controller 3 reads the image data in the RGB format (image drawn for emphasizing the recognized object) stored in the frame buffer FB13 and the image data in the format of only Y data stored in the frame buffer FB14. As the third format converting process in S7, the display controller 3 adds UV data to image data in the format of only Y data to thereby obtain image data in the YUV format, further converts the image data into image data in the RGB format, combines the image data in the RGB format with the image data in the RGB format stored in the frame buffer FG13 in layers, and outputs the resultant image data as image data in the RGB format in one layer to an external display such as an LCD. In image recognition, image data in the format of only Y data is processed. Consequently, the image data can be processed at a speed higher than that in the case of performing the image recognizing process on image data in the YUV format.

Also in the case where the drawing process in S6 is not performed in the first combination, combinations of the first to third format converting processes are unchanged (the distortion correction and the image recognizing process are performed). Also in the case where the image distortion correction is not performed, the combinations of the first to third format converting processes are unchanged (the image recognizing process and the drawing process are performed).

As an example of a second combination of the format converting processes in FIG. 12, the case of performing image recognition using a color (for example, colors of signs and signals) is assumed. First, image data in the YUV format is input from the outside, and the image data input units 4 and 5 fetch the image data. The YUV to RGB conversion is performed in the first format converting process in S2, and the image data in the RGB format is written in a frame buffer FB15 in the DDR-SDRAM 17. The image data in the RGB format written in the frame buffer FB 15 is read, and the distortion correction or bird's eye view process is performed by the CPU 7 or the graphic processor 8. The resultant data is written in a frame buffer FB16 in the DDR-SDRAM 17. As the second format converting process in S4, the image data in the RGB format written in the frame buffer FB16 is converted from the RGB format to the YUV format by the format converter 10, and the conversion result is written in a frame buffer FB17 in the DDR-SDRAM 17. The image data in the YUV format in the frame buffer FB17 is read by the image recognizing process accelerator 2 and processed so as to be recognized by the CPU 7, and the processed data is written in a frame buffer FB18 in the DDR-SDRAM 17. The CPU 7 reads the image data in the format of only Y data (or binary image data) stored in the frame buffer FB18, performs recognizing process, and passes the recognition result (indicative of a recognized object) and coordinate data of the recognized object to the graphic processor 8. On the basis of the received recognition result and the coordinate data of the recognized object, the graphic processor 8 performs a drawing operation for emphasizing the recognized object and writes the resultant image into a frame buffer FB19 in the DDR-SDRAM 17. The display controller 3 reads the image data in the RGB format written in the frame buffer FB16 and the image data in the RGB format written in the frame buffer FB19, combines the image data in read two frames in layers, and outputs the resultant image data as image data in the RGB format of one frame to the outside.

As an example of a third combination of the format converting processes in FIG. 12, the case of performing only distortion correction on an image captured by a back camera at the time of parking, and displaying the resultant image on an LCD is assumed. First, image data in the YUV format is input from the outside, and the image data input units 4 and 5 fetch the image data. The YUV to RGB conversion is performed in the format converting process in S2, and the image data in the RGB format is written in a frame buffer FB20 in the DDR-SDRAM 17. The CPU 7 or the graphic processor 8 reads the image data in the RGB format written in the frame buffer FB 20, performs the distortion correction or bird's eye view process, and writes the process resultant data in a frame buffer FB21. The second format converting process in S4 is not performed, and the image data in the RGB format stored in the frame buffer FB21 is read by the display controller 3. The display controller 3 outputs the image data in the RGB format to the LCD without performing the third format conversion.

In a fourth combination of FIG. 13, the case of receiving image data in the RGB format from the outside and performing parking assistance or three-dimensional image recognition (to obtain distance to an object by using parallax) is assumed. First, image data in the RGB format is input from the outside, and the image data input units 4 and 5 fetch the image data. The format conversion from RGB to YUV and from YUV to only Y is performed in the format converting process in S2, and the image data in the format of only Y is written in a frame buffer FB22 in the DDR-SDRAM 17. The CPU 7 or graphic processor 8 reads the image data in the format of only Y data written in the frame buffer FB22, performs the distortion correction or bird's eye view process, and writes the process result in a frame buffer FB23 in the DDR-SDRAM 17. Since the image data is in the format of only Y data, the second format conversion in step S4 is unnecessary. The image data in the format of only Y data written in the frame buffer FB23 is read by the image recognizing process accelerator 2, and subjected to an image process so that the image data can be recognized by the CPU 7, and the processed data is written in a frame buffer FB24 in the DDR-SDRAM 17. The CPU 7 reads the image data in the format of only Y data (or binary image data) stored in the frame buffer FB24, performs recognizing process, and passes the recognition result (indicative of a recognized object) and coordinate data of the recognized object to the graphic processor 8. On the basis of the received recognition result and the coordinate data of the recognized object, the graphic processor 8 performs a drawing operation for emphasizing the recognized object and writes the resultant image (such as marking or pattern) into a frame buffer FB25. It is assumed that the in-progress image data in the format of only Y data subjected to the image recognizing process (the γ correction, the smoothing process, and the like) is stored in, for example, a frame buffer FB26. Since the image data in the format of only Y data stored in the frame buffer FB26 is image data subjected to the processes such as the γ correction and the smoothing process, obviously, the data is clearer than image data in the format of only Y data stored in the frame buffer FB22 or FB23. The display controller 3 reads the image data in the RGB format (image drawn for emphasizing the recognized object) stored in the frame buffer FB25 and the image data in the format of only Y data stored in the frame buffer FB26. By the third format converting process in S7, the display controller 3 adds UV data to the image data in the format of only Y data to thereby obtain image data in the YUV format, and further converts the image data into image data in the RGB format. After that, the display controller 3 combines the image data in layers, and outputs the resultant image data as image data in the RGB format in one layer to the outside. Since the image recognition is performed by using the image data in the format of only Y data, the process can be performed at a speed higher than that in the case of performing the image recognition using the image data in the RGB format.

In a fifth combination of FIG. 13, the case of receiving image data in the RGB format from the outside and performing using colors is assumed. First, image data in the RGB format is input from the outside, fetched by the image data input units 4 and 5, and stored in a frame buffer FB27 in the DDR-SDRAM 17. Since the image data is in the RGB format, the first format converting process in step S2 is unnecessary. The CPU 7 or graphic processor 8 reads the image data in the RGB format written in the frame buffer FB27, performs the distortion correction or bird's eye view process, and writes the process result in a frame buffer FB28. As the second format converting process in S4, the image data in the RGB format stored in the frame buffer FB28 is converted from the RGB format to the YUV format by the format converter 10, and the conversion result is written in a frame buffer FB29 in the DDR-SDRAM 17. The image data in the YUV format written in the frame buffer FB29 is read by the image recognizing process accelerator 2 and processed so as to be recognized by the CPU 7, and the processed data is written in a frame buffer FB30 in the DDR-SDRAM 17. The CPU 7 reads the image data in the format of only Y data (or binary image data) stored in the frame buffer FB30, performs recognizing process, and passes the recognition result (indicative of a recognized object) and coordinate data of the recognized object to the graphic processor 8. On the basis of the received recognition result and the coordinate data of the recognized object, the graphic processor 8 performs a drawing operation for emphasizing the recognized object and writes the resultant image into a frame buffer FB31 in the DDR-SDRAM 17. It is assumed that the in-progress image data in the YUV format subjected to the image recognizing process is stored in, for example, a frame buffer FB32. Since the image data in the YUV format stored in the frame buffer FB32 is image data subjected to the image processes, obviously, the data is clearer than image data in the RGB format stored in the frame buffer FB27 or image data in the YUV format stored in the frame buffer FB 28 or FB29. The display controller 3 reads the image data in the YUV format written in the frame buffer FB32 and the image data in the RGB format written in the frame buffer FB31, converts the image data in the YUV format to image data in the RGB format in the third format converting process in S7, combines the image data, and outputs the resultant image data to an LCD on the outside.

As a sixth combination in FIG. 12, the case of inputting image data in the RGB format from the outside and performing image recognition using colors (for example, colors of signs and signals) is assumed. First, image data in the RGB format is input from the outside, and the image data input units 4 and 5 fetch the image data. Since the image data is in the RGB format, without performing the first format converting process, the image data is stored in a frame buffer FB 33 in the DDR-SDRAM 17. The CPU 7 or graphic processor 8 reads the image data in the RGB format stored in the frame buffer FB33, performs the distortion correction or bird's eye view process, and writes the process result in a frame buffer FB34. As the second format converting process in S4, the image data in the RGB format stored in the frame buffer FB34 is converted from the RGB format to the YUV format by the format converter 10, and the conversion result is stored in a frame buffer FB35 in the DDR-SDRAM 17. The image data in the YUV format stored in the frame buffer FB35 is read by the image recognizing process accelerator 2 and processed so as to be recognized by the CPU 7, and the processed data is stored in a frame buffer FB36. The CPU 7 reads the image data in the format of only Y data (or binary image data) stored in the frame buffer FB36, performs the image recognizing process, and passes the recognition result (indicative of a recognized object) and coordinate data of the recognized object to the graphic processor 8. On the basis of the received recognition result and the coordinate data of the recognized object, the graphic processor 8 draws a marking, a pattern, or the like for emphasizing the recognized object and writes the resultant image into a frame buffer FB37. The display controller 3 reads the image data in the RGB format written in the frame buffer FB34 and the image data in the RGB format written in the frame buffer FB37. Since both of the images are image data in the RGB format, without performing the third format converting process, the images in layers are combined, and the resultant image data is output as image data in the RGB format to an external LCD.

The image data processor 1 described above produces the following effects.

(1) Arbitration is performed between a bus arbitration result between modules requiring real-time performance and a bus request from another module by, as arbitration methods, bus arbitration by round robin of sequentially, dynamically changing priority and bus arbitration by round robin and partly, in addition, the fixed priority level control. Thus, assurance of the real-time performance of the real-time modules coupled to the first bus BUS1, suppression of drastic decrease in the data bandwidth of the non-real-time modules coupled to the second bus BUS2, and assurance of high data bandwidth of the image recognizing process accelerator 2 coupled to the first bus BUS1 can be realized.

(2) Further, the bus arbitration can be realized by the arbitration circuits ARB1 and ARB2 so as to satisfy the real-time performance of the display controller 3 severer than that of the image recognizing process accelerator 2, and high data bandwidth of the image recognizing process accelerator 2.

(3) The image data input units 4 and 5 has the format converters 4A and 5A, respectively, the display controller 3 has the format converter 3A, and the format converter 10 for conversion from RGB to YUV is provided. Consequently, the image data processor 1 can deal with the format conversion of image data input from the outside, format conversion for outputting display data to an external display, and format conversion suitable for an internal image process such as image recognition performed in the YUV format and graphic operation performed in the RGB format.

(4) The image data processor 1 can realize that the image recognizing process accelerator 2 requested to have high data bandwidth and real-time performance is formed on a chip, the modules 3, 4, and 5 requested to have real-time performance and the non-real-time modules 7, 8, 9, and 10 requested to have a certain data bandwidth coexist on the same chip, and a plurality of bus master modules formed on the chip share the DDR-SDRAM 17 on the outside.

Although the invention achieved by the inventors has been concretely described on the basis of the embodiments, obviously, the invention is not limited to the embodiments but can be variously modified without departing from the gist of the invention.

For example, the central processing unit is not limited to the configuration having the cache memory and the address conversion buffer. The second bus BUS2 may be constructed hierarchically and, accordingly, the arbitration circuit ARB2 may be constructed hierarchically. In this case, naturally, arbitration with the first arbitration circuit ARB1 may be performed at the highest level of the arbitration circuit ARB2. The image data processor 1 may have other accelerators and peripheral circuits.

Although not shown, the image data processor 1 may be sealed in the same package as the DDR-SDRAM 17 and electrically coupled using bumps and wires via a wiring board. Alternatively, the image data processor 1 and the DDR-SDRAM 17 may be sealed in different packages and coupled to each other via wires on a mounting board.

What is claimed is:

1. A data processor formed on a single semiconductor substrate, the data processor comprising:
    a central processing unit;
    a graphic controller;
    a display controller;
    an image recognizing module adapted to perform a filter process to Y-format image data, an edge extracting process and a binarizing process;
    a memory controller capable of controlling an access to an external memory coupled on the outside; and
    an image data input unit adapted to input image data from the outside and to perform necessary format conversion on the image data,
    wherein the display controller performs display control on the image data read from the external memory via the memory controller,
    wherein the image data input unit stores the image data input from the outside or the image data subjected to the necessary format conversion into a first area in the external memory via the memory controller,
    wherein the image recognizing module executes an image process using the image data in the first area or image data in a second area obtained by performing necessary data process on the image data in the first area,
    wherein the image process of the image recognizing module includes the filter process, the edge extracting process and the binarizing process,
    wherein the image recognizing module performs the filter process to Y-format image data, and performs the edge extracting process to data based on the filter process, and performs the binarizing process to data based on the edge extracting process, and stores a result of the binarizing process in a third area of the external memory,
    wherein the central processing unit or the image recognizing module performs image recognition which recognizes lanes and a vehicle on a front side, using data in the third area of the external memory,
    wherein the graphic controller stores graphic data in an RGB format in a fourth area in the external memory on the basis of the result of the image recognition in the third area of the external memory,
    wherein the display controller can output the image data stored in the first area or the image data in the RGB format obtained by converting the format of the image data stored in the first area, and graphic data in the fourth area so as to be overlaid on a display coupled on the outside,
    wherein the data processor further comprises a first bus to which the image recognizing module, the image data input unit, and the display controller are coupled, a second bus to which the central processing unit and the memory controller are coupled, a first arbitration circuit for arbitrating bus requests from the circuits coupled to the first bus, and a second arbitration circuit for arbitrating a result of the arbitration of the first arbitration circuit and bus requests from the other circuits,
    wherein each of the first and second arbitration circuits can change an arbitration control mode in accordance with a set value in the control register, and
    wherein when a first value is set in the control register, the first arbitration circuit arbitrates a conflict of bus requests from bus masters coupled to the first bus by round robin, and the second arbitration circuit arbitrates a conflict of bus requests from bus masters coupled to the second bus by round robin, and arbitrates a conflict between the arbitration result and a result of arbitration of the first arbitration circuit by round robin.

2. A data processor formed on a single semiconductor substrate, the data processor comprising:
    a central processing unit;
    a graphic controller;
    a display controller;
    an image recognizing module adapted to perform a filter process to Y-format image data, an edge extracting process and a binarizing process;
    a memory controller capable of controlling an access to an external memory coupled on the outside; and
    an image data input unit adapted to input image data from the outside and to perform necessary format conversion on the image data,
    wherein the display controller performs display control on the image data read from the external memory via the memory controller,
    wherein the image data input unit stores the image data input from the outside or the image data subjected to the necessary format conversion into a first area in the external memory via the memory controller,
    wherein the image recognizing module executes an image process using the image data in the first area or image data in a second area obtained by performing necessary data process on the image data in the first area,
    wherein the image process of the image recognizing module includes the filter process, the edge extracting process and the binarizing process,
    wherein the image recognizing module performs the filter process to Y-format image data, and performs the edge extracting process to data based on the filter process, and performs the binarizing process to data based on the edge extracting process, and stores a result of the binarizing process in a third area of the external memory,
    wherein the central processing unit or the image recognizing module performs image recognition which recognizes lanes and a vehicle on a front side, using data in the third area of the external memory, wherein the graphic controller stores graphic data in an RGB format in a fourth area in the external memory on the basis of the result of the image recognition in the third area of the external memory, wherein the display controller can output the image data stored in the first area or the image data in the RGB format obtained by converting the format of the image data stored in the first area, and graphic data in the fourth area so as to be overlaid on a display coupled on the outside, wherein the data processor further comprises a first bus to which the image recognizing module, the image data input unit, and the display controller are coupled, a second bus to which the central processing unit and the memory controller are coupled, a first arbitration circuit for arbitrating bus requests from the circuits coupled to the first bus, and a second arbitration circuit for arbitrating a result of the arbitration of the first arbitration circuit and bus requests from the other circuits, wherein each of the first and second arbitration circuits can change an arbitration control mode in accordance with a set value in the control register, and wherein when a second value is set in the control register, the first arbitration circuit arbitrates a conflict of bus requests from the image data input unit and the display controller coupled to the first bus by round robin, and the second arbitration circuit arbitrates a conflict of bus requests from bus masters coupled to the second bus by first round robin, arbitrates a conflict between the arbitration result of the first round robin and a bus request from the image recognizing module by second round robin, and performs priority level control placing higher priority on the arbitration result of the first arbitration circuit with respect to a conflict between the arbitration result of the first arbitration circuit and the arbitration result of the second round robin.

3. A data processor formed on a single semiconductor substrate, the data processor comprising:
a central processing unit;
a graphic controller;
a display controller;
an image recognizing module adapted to perform a filter process to Y-format image data, an edge extracting process and a binarizing process;
a memory controller capable of controlling an access to an external memory coupled on the outside; and
an image data input unit adapted to input image data from the outside and to perform necessary format conversion on the image data, wherein the display controller performs display control on the image data read from the external memory via the memory controller, wherein the image data input unit stores the image data input from the outside or the image data subjected to the necessary format conversion into a first area in the external memory via the memory controller, wherein the image recognizing module executes an image process using the image data in the first area or image data in a second area obtained by performing necessary data process on the image data in the first area, wherein the image process of the image recognizing module includes the filter process, the edge extracting process and the binarizing process, wherein the image recognizing module performs the filter process to Y-format image data, and performs the edge extracting process to data based on the filter process, and performs the binarizing process to data based on the edge extracting process, and stores a result of the binarizing process in a third area of the external memory, wherein the central processing unit or the image recognizing module performs image recognition which recognizes lanes and a vehicle on a front side, using data in the third area of the external memory, wherein the graphic controller stores graphic data in an RGB format in a fourth area in the external memory on the basis of the result of the image recognition in the third area of the external memory, wherein the display controller can output the image data stored in the first area or the image data in the RGB format obtained by converting the format of the image data stored in the first area, and graphic data in the fourth area so as to be overlaid on a display coupled on the outside, wherein the data processor further comprises a first bus to which the image recognizing module, the image data input unit, and the display controller are coupled, a second bus to which the central processing unit and the memory controller are coupled, a first arbitration circuit for arbitrating bus requests from the circuits coupled to the first bus, and a second arbitration circuit for arbitrating a result of the arbitration of the first arbitration circuit and bus requests from the other circuits, wherein each of the first and second arbitration circuits can change an arbitration control mode in accordance with a set value in the control register, and wherein when a third value is set in the control register, the first arbitration circuit arbitrates a conflict of bus requests from the image recognizing module and the display controller coupled to the first bus by round robin, and the second arbitration circuit arbitrates a conflict of bus requests from bus masters coupled to the second bus by first round robin and, with respect to a conflict among the arbitration result of the first arbitration circuit, the arbitration result of the first round robin, and a bus request from the image recognizing module, performs priority level control placing highest priority on the arbitration result of the first arbitration circuit and placing the second highest priority on the bus request from the image recognizing module.

4. A data processor formed on a single semiconductor integrated circuit, the data processor comprising:
a central processing unit;
a graphic controller;
a display controller;
an image recognizing module adapted to perform an image process which includes a filter process to Y-format image data, an edge extracting process and a binarizing process;
a memory controller capable of controlling an access to an external memory coupled on the outside; and
an image data input unit adapted to input image data from the outside and capable of performing necessary first format conversion on the image data, and to store the data into a first area in the external memory via the memory controller, wherein the display controller performs display control on the image data read from the external memory via the memory controller, wherein the image recognizing module can execute the image process using the image data stored in the memory, wherein the image recognizing module performs the filter process to Y-format image data using the image data in the first area or image data in second area subjected to necessary data process, and performs the edge extracting process to data based on the filter process, and performs the binarizing process to data based on the edge extracting process, and stores a result of the binarizing process in a third area in the external memory, wherein the image recognizing module or the central processing unit performs image recognition using the image data in the third area of the external memory, wherein the data processor further comprises a first bus to which the image recognizing module, the image data input unit, and the display controller are coupled, and a second bus to which the central processing unit and the memory controller are coupled, wherein the graphic controller stores image data in the external memory via the memory controller in response to an instruction from the central processing unit, wherein the display controller outputs image data read from the external memory via the memory controller to a display on the outside, wherein the data processor further comprises a first arbitration circuit and a second arbitration circuit, wherein the first arbitration circuit arbitrates a conflict of bus requests from the bus masters coupled to the first bus by round robin, and wherein the second arbitration circuit arbitrates a conflict of bus requests from the bus masters coupled to the second bus by round robin, and arbitrates a conflict between the arbitration result and an arbitration result of the first arbitration circuit by round robin.

5. The data processor according to claim 4, wherein the second arbitration circuit performs a control of setting maximum bus use wait time for a bus request permitted to use a bus to transfer of a specified data amount.

6. The data processor according to claim 4, wherein the second arbitration circuit performs arbitration by round robin by assigning a plurality of time slices to a bus request from the display controller.

7. A data processor formed on a single semiconductor integrated circuit, the data processor comprising:
   a central processing unit;
   a graphic controller;
   a display controller;
   an image recognizing module adapted to perform an image process which includes a filter process to Y-format image data, an edge extracting process and a binarizing process;
   a memory controller capable of controlling an access to an external memory coupled on the outside; and
   an image data input unit adapted to input image data from the outside and capable of performing necessary first format conversion on the image data, and to store the data into a first area in the external memory via the memory controller, wherein the display controller performs display control on the image data read from the external memory via the memory controller, wherein the image recognizing module can execute the image process using the image data stored in the memory, wherein the image recognizing module performs the filter process to Y-format image data using the image data in the first area or image data in second area subjected to necessary data process, and performs the edge extracting process to data based on the filter process, and performs the binarizing process to data based on the edge extracting process, and stores a result of the binarizing process in a third area in the external memory, wherein the image recognizing module or the central processing unit performs image recognition using the image data in the third area of the external memory, wherein the data processor further comprises a first bus to which the image recognizing module, the image data input unit, and the display controller are coupled, and a second bus to which the central processing unit and the memory controller are coupled, wherein the graphic controller stores image data in the external memory via the memory controller in response to an instruction from the central processing unit, wherein the display controller outputs image data read from the external memory via the memory controller to a display on the outside, wherein the data processor further comprises a first arbitration circuit and a second arbitration circuit, wherein the first arbitration circuit arbitrates a conflict of bus requests from the image data input unit and the display controller coupled to the first bus by round robin, and wherein the second arbitration circuit arbitrates a conflict of bus requests from bus masters coupled to the second bus by first round robin, arbitrates a conflict between the arbitration result of the first round robin and a bus request from the image recognizing module by second round robin, and performs priority level control placing higher priority on the arbitration result of the first arbitration circuit with respect to a conflict between the arbitration result of the first arbitration circuit and the arbitration result of the second round robin.

8. The data processor according to claim 7, wherein the second arbitration circuit performs a control of setting maximum bus use wait time for a bus request permitted to use a bus to transfer of a specified data amount.

9. The data processor according claim 7, wherein the second arbitration circuit performs arbitration by round robin by assigning a plurality of time slices to a bus request from the display controller.

10. A data processor formed on a single semiconductor integrated circuit, the data processor comprising:
    a central processing unit;
    a graphic controller;
    a display controller;
    an image recognizing module adapted to perform an image process which includes a filter process to Y-format image data, an edge extracting process and a binarizing process;
    a memory controller capable of controlling an access to an external memory coupled on the outside; and
    an image data input unit adapted to input image data from the outside and capable of performing necessary first format conversion on the image data, and to store the data into a first area in the external memory via the memory controller, wherein the display controller performs display control on the image data read from the external memory via the memory controller, wherein the image recognizing module can execute the image process using the image data stored in the memory, wherein the image recognizing module performs the filter process to Y-format image data using the image data in the first area or image data in second area subjected to necessary data process, and performs the edge extracting process to data based on the filter process, and performs the binarizing process to data based on the edge extracting process, and stores a result of the binarizing process in a third area in the external memory, wherein the image recognizing module or the central processing unit performs image recognition using the image data in the third area of the external memory, wherein the data processor further comprises a first bus to which the image recognizing module, the image data input unit, and the display controller are coupled, and a second bus to which the central processing unit and the memory controller are coupled, wherein the graphic controller stores image data in the external memory via the memory controller in response to an instruction from the central processing unit, wherein the display controller outputs image data read from the external memory via the memory controller to a display on the outside, wherein the data processor further comprises a first arbitration circuit and a second arbitration circuit, wherein the first arbitration circuit arbitrates a conflict of bus requests from the image recognizing module and the display controller coupled to the first bus by round robin, and wherein the second arbitration circuit arbitrates a conflict of bus requests from bus masters coupled to the second bus by first round robin and, with respect to a conflict among the arbitration result of the first arbitration circuit, the arbitration result of the first round robin, and the bus request from the image recognizing module, performs priority level control placing highest priority on the arbitration result of the first arbitration circuit and placing the second highest priority on the bus request from the image recognizing module.

11. The data processor according to claim 10, wherein the second arbitration circuit performs a control of setting maximum bus use wait time for a bus request permitted to use a bus to transfer of a specified data amount.

12. The data processor according claim 10, wherein the second arbitration circuit performs arbitration by round robin by assigning a plurality of time slices to a bus request from the display controller.

13. A data processor formed on a single semiconductor integrated circuit, the data processor comprising:
a central processing unit;
a graphic controller;
a display controller;
an image recognizing module adapted to perform an image process which includes a filter process to Y-format image data, an edge extracting process and a binarizing process;
a memory controller capable of controlling an access to an external memory coupled on the outside; and
an image data input unit adapted to input image data from the outside and capable of performing necessary first format conversion on the image data, and to store the data into a first area in the external memory via the memory controller,
wherein the display controller performs display control on the image data read from the external memory via the memory controller,
wherein the image recognizing module can execute the image process using the image data stored in the memory,
wherein the image recognizing module performs the filter process to Y-format image data using the image data in the first area or image data in second area subjected to necessary data process, and performs the edge extracting process to data based on the filter process, and performs the binarizing process to data based on the edge extracting process, and stores a result of the binarizing process in a third area in the external memory,
wherein the image recognizing module or the central processing unit performs image recognition using the image data in the third area of the external memory,
wherein the image process is a process of extracting an edge of an image using, as image data subjected to the first format conversion, image data of Y data obtained by converting the format of image data in the YUV format,
wherein the data processor further comprises a first bus to which the image recognizing module, the image data input unit, and the display controller are coupled;
a second bus to which the central processing unit and the memory controller are coupled;
a first arbitration circuit; and
a second arbitration circuit,
wherein the graphic controller stores image data in the external memory via the memory controller in response to an instruction from the central processing unit,
wherein the display controller outputs image data read from the external memory via the memory controller to a display on the outside,
wherein the first arbitration circuit arbitrates a conflict of bus requests from the bus masters coupled to the first bus by round robin, and
wherein the second arbitration circuit arbitrates a conflict of bus requests from the bus masters coupled to the second bus by round robin, and arbitrates a conflict between the arbitration result and an arbitration result of the first arbitration circuit by round robin.

14. A data processor formed on a single semiconductor integrated circuit, the data processor comprising:
a central processing unit;
a graphic controller;
a display controller;
an image recognizing module adapted to perform an image process which includes a filter process to Y-format image data, an edge extracting process and a binarizing process;
a memory controller capable of controlling an access to an external memory coupled on the outside; and
an image data input unit adapted to input image data from the outside and capable of performing necessary first format conversion on the image data, and to store the data into a first area in the external memory via the memory controller,
wherein the display controller performs display control on the image data read from the external memory via the memory controller,
wherein the image recognizing module can execute the image process using the image data stored in the memory,
wherein the image recognizing module performs the filter process to Y-format image data using the image data in the first area or image data in second area subjected to necessary data process, and performs the edge extracting process to data based on the filter process, and performs the binarizing process to data based on the edge extracting process, and stores a result of the binarizing process in a third area in the external memory,
wherein the image recognizing module or the central processing unit performs image recognition using the image data in the third area of the external memory, wherein the graphic controller stores graphic data in an RGB format in a fourth area in the external memory on the basis of the result of the image recognition, wherein the display controller can output the image data stored in the first area or the image data in the RGB format obtained by performing necessary second format conversion on the image data stored in the first area, and graphic data in the fourth area so as to be overlaid on a display coupled on the outside, wherein the display controller has a third format converter for performing the second format conversion, wherein the third format converter has a function of converting image data from the YUV format to the RGB format and a function of adding UV data to image data of Y data, wherein the data processor further comprises a first bus to which the image recognizing module, the image data input unit, and the display controller are coupled;

a second bus to which the central processing unit and the memory controller are coupled;

a first arbitration circuit; and a second arbitration circuit, wherein the graphic controller stores image data in the external memory via the memory controller in response to an instruction from the central processing unit, wherein the display controller outputs image data read from the external memory via the memory controller to a display on the outside, wherein the first arbitration circuit arbitrates a conflict of bus requests from the bus masters coupled to the first bus by round robin, and wherein the second arbitration circuit arbitrates a conflict of bus requests from the bus masters coupled to the second bus by round robin, and arbitrates a conflict between the arbitration result and an arbitration result of the first arbitration circuit by round robin.

* * * * *